(12) United States Patent  (10) Patent No.: US 9,183,689 B2
Chari  (45) Date of Patent: Nov. 10, 2015

(54) COMPACT ASSISTIVE READING DEVICE

(76) Inventor: Venkatesh Rajagopalan Chari, North Andover, MA (US)

( * ) Notice: Subject to any disclaimer, the term of this patent is extended or adjusted under 35 U.S.C. 154(b) by 785 days.

(21) Appl. No.: 13/378,807

(22) PCT Filed: Jun. 18, 2010

(86) PCT No.: PCT/US2010/001762
§ 371 (c)(1),
(2), (4) Date: Mar. 2, 2012

(87) PCT Pub. No.: WO2010/151305
PCT Pub. Date: Dec. 29, 2010

(65) Prior Publication Data
US 2012/0154561 A1  Jun. 21, 2012

Related U.S. Application Data

(60) Provisional application No. 61/220,756, filed on Jun. 26, 2009.

(51) Int. Cl.
*H04N 7/18*  (2006.01)
*G07D 7/12*  (2006.01)

(52) U.S. Cl.
CPC . *G07D 7/128* (2013.01); *H04N 7/18* (2013.01)

(58) Field of Classification Search
CPC combination set(s) only.
See application file for complete search history.

(56) References Cited

U.S. PATENT DOCUMENTS

| 3,842,281 A | 10/1974 | Goodrich |
| 4,563,771 A | 1/1986 | Gorgone et al. |
| 5,046,163 A | 9/1991 | Priest et al. |
| 5,680,472 A | 10/1997 | Conant |
| 5,692,068 A | 11/1997 | Bryenton et al. |
| 6,731,326 B1 | 5/2004 | Bettinardi |
| 6,985,169 B1 * | 1/2006 | Deng et al. ............... 348/61 |

(Continued)

FOREIGN PATENT DOCUMENTS

| EP | 0907151 A2 | 4/1999 |
| GB | 2271456 A | 4/1994 |

OTHER PUBLICATIONS

Money Talks Money Identifier for the Blind / Everyday Talking Products—MaxiAids.com, p. 1 of 3 (Sep. 18, 2012) http://www.maxiaids.com/products/7870/Money-Talks-Money-Identifter-for-the-Blind.html.

(Continued)

*Primary Examiner* — Dave Czekaj
*Assistant Examiner* — Kehinde O Abimbola
(74) *Attorney, Agent, or Firm* — Wolf, Greenfield & Sacks, P.C.

(57) ABSTRACT

A compact assistive reading device. A compact form factor is achieved through the use of an optical system with a pin hole aperture, which also obviates the needs for mirrors. One or more light sources are positioned outside the field of view of the optical system. A structure such as a prism film, patterned reflector or light pipe may be used to provide an illumination pattern that enhances the quality of images formed with the optical system. Additionally, processing components to recognize text, numbers or other information on an item placed in the imaging area of the optical system may be incorporated into a housing with the optical system. The housing contains features to facilitate easy insertion of an object into the imaging area and sensors to indicate when the object is properly positioned. The device may function as a currency reader.

31 Claims, 18 Drawing Sheets

(56) References Cited

U.S. PATENT DOCUMENTS

| | | | |
|---|---|---|---|
| 7,366,337 B2 | 4/2008 | Kortum et al. | |
| 7,847,994 B2 * | 12/2010 | Park | 359/204.1 |
| 2005/0031171 A1 | 2/2005 | Krukowski et al. | |
| 2005/0175230 A1 | 8/2005 | Kortum et al. | |
| 2008/0069425 A1 | 3/2008 | Liu et al. | |
| 2008/0130980 A1 | 6/2008 | Gildersleeve et al. | |
| 2008/0187210 A1 * | 8/2008 | Kortum et al. | 382/135 |
| 2009/0002793 A1 * | 1/2009 | Park | 359/206 |
| 2009/0108074 A1 * | 4/2009 | Vinogradov | 235/462.42 |
| 2010/0155481 A1 * | 6/2010 | Vinogradov et al. | 235/462.21 |

OTHER PUBLICATIONS

Press Release—Maxi-Aids' Money Talks Money Identifier Brings Technology to the . . . , p. 1 of 2 (downloaded Sep. 18, 2012) http://www.24-7pressrelease.com/press-release/maxiaids-money-talks-money-identifier-bri . . . , dated Feb. 4, 2009.
International Search Report (mailed Jan. 19, 2011) and Written Opinion (issued Jan. 4, 2012) for PCT/US2010/001762.

* cited by examiner

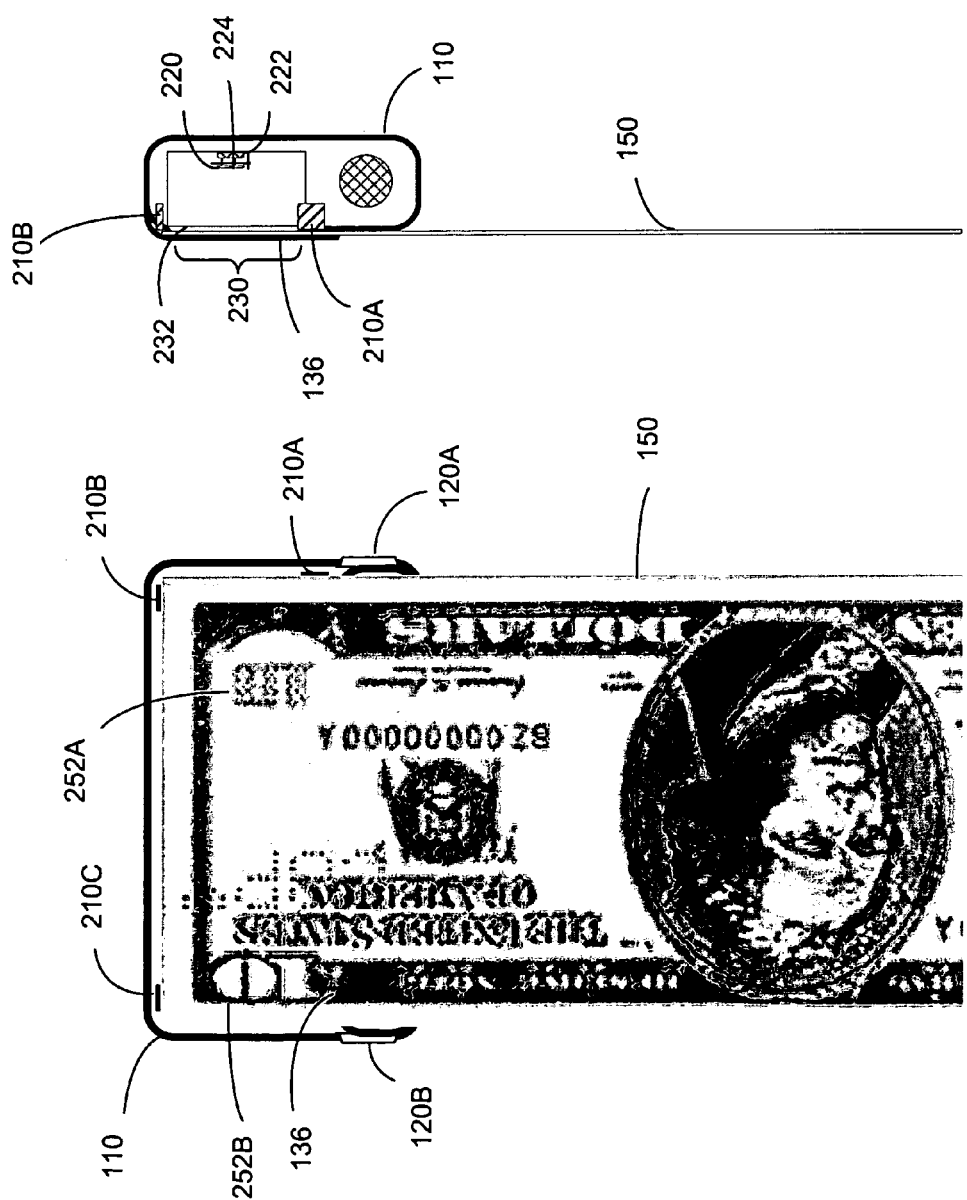
*FIG. 2A*
*FIG. 2B*
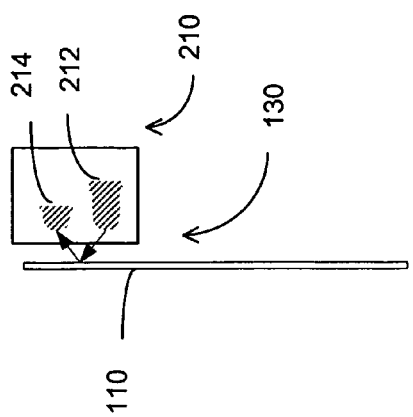
*FIG. 2C*

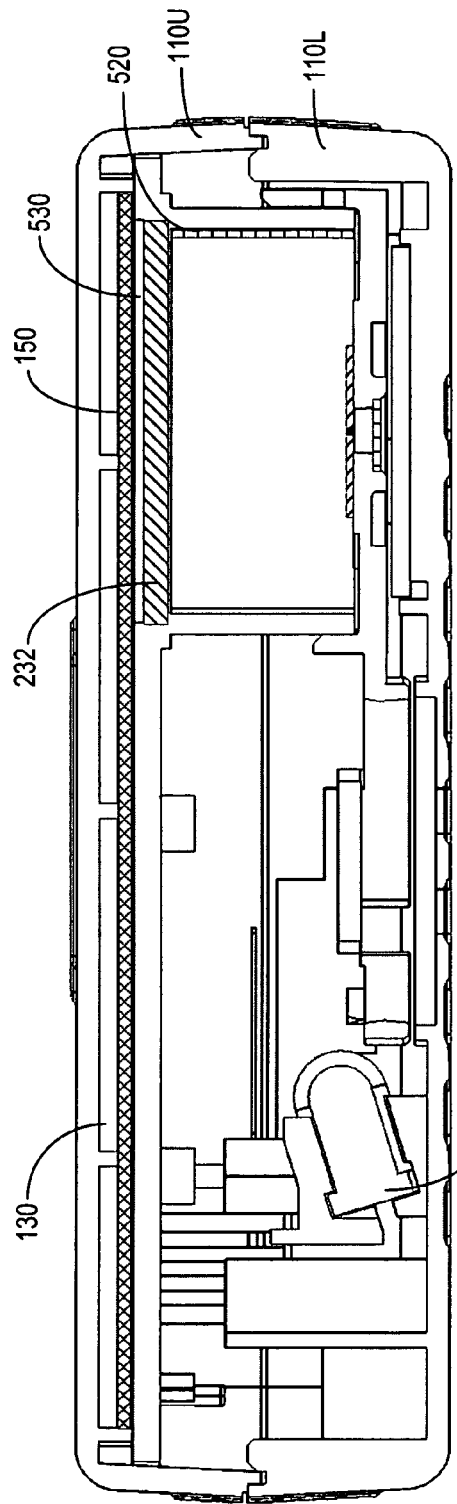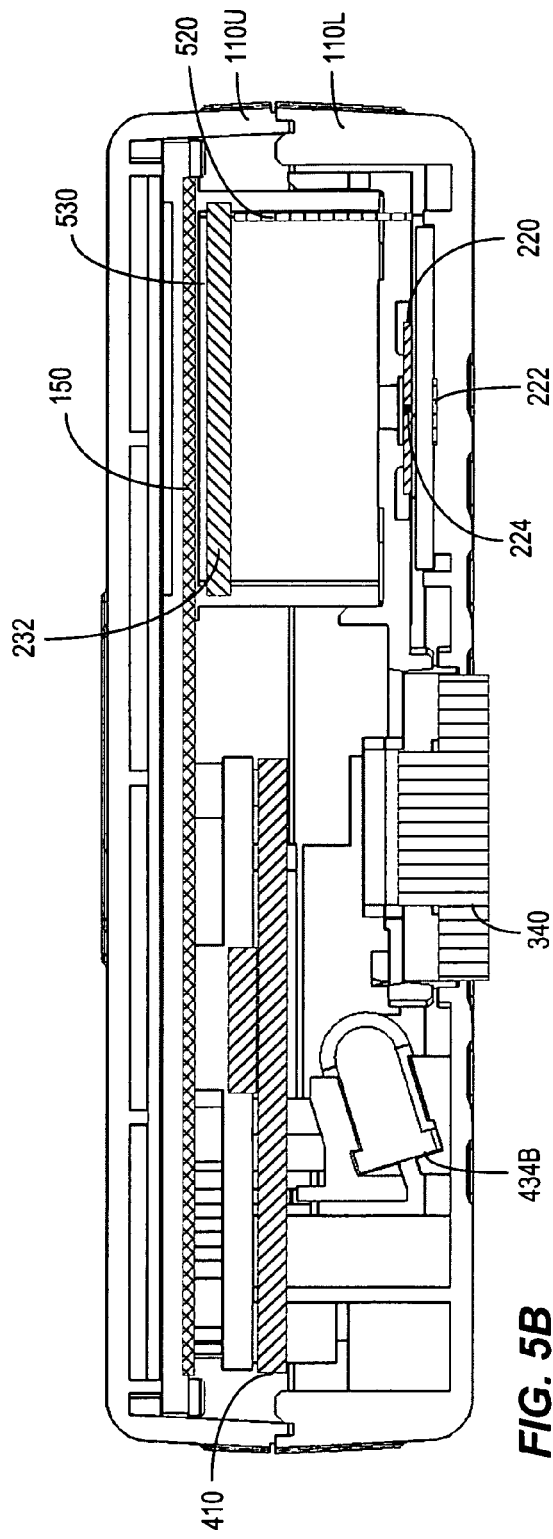
FIG. 5A
FIG. 5B

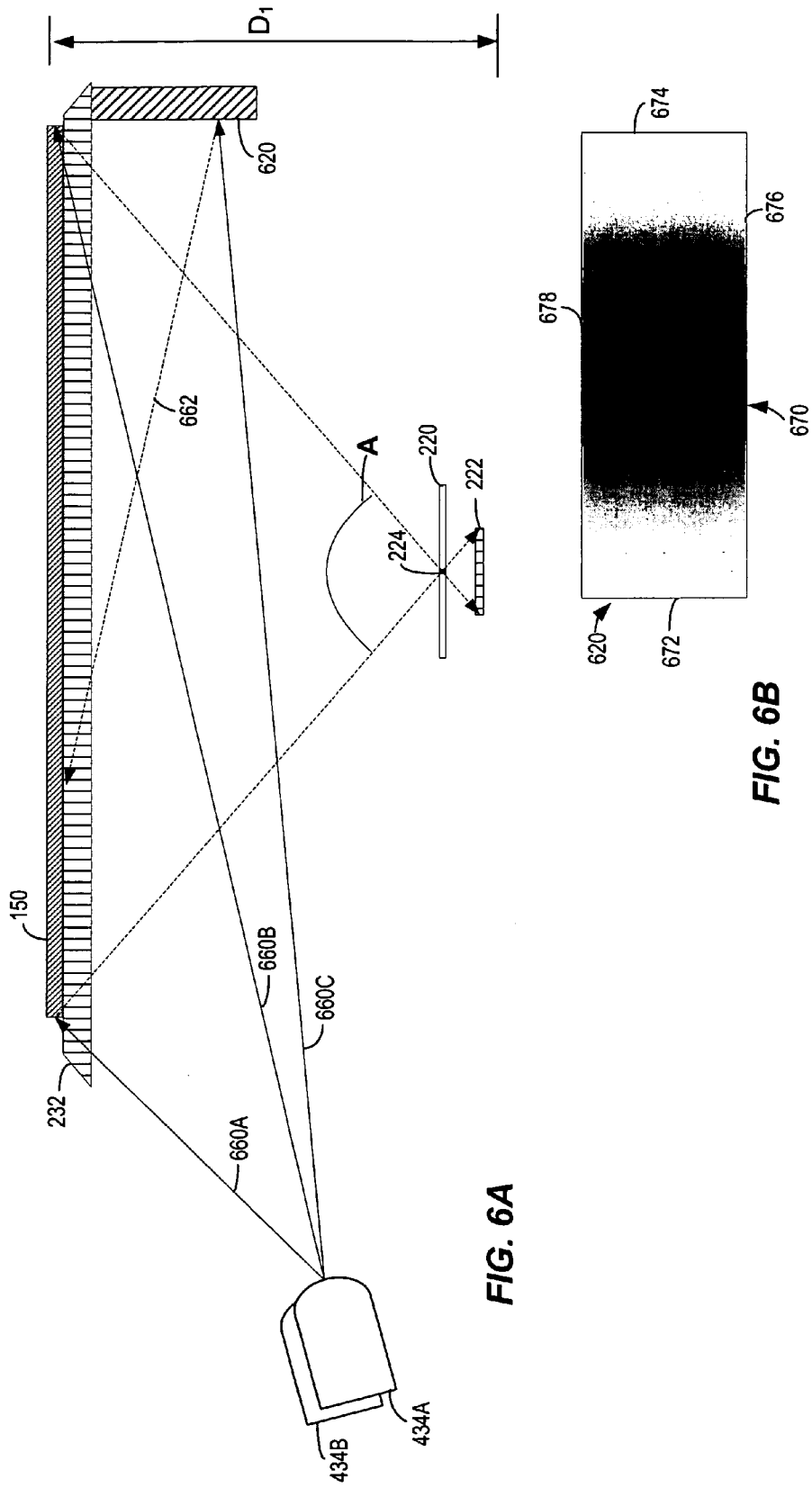

COMPACT ASSISTIVE READING DEVICE

BACKGROUND

1. Field of the Invention

The application relates generally to assistive devices for the visually impaired and more specifically to compact assistive reading devices

2. Description of Related Art

Technology has been used to aid the visually impaired perform tasks that many sighted people take for granted. One such approach has been to use a camera to form images of documents or other items. A computer or other device receives the output of the camera and enlarges it for display. Such magnification-based systems are useful only for partially-sighted users.

Assistive devices have also been developed for users who cannot read or extract useful from a display, even if substantially magnified. Such systems have used audio output, such as speech to text converters, to convert items containing text to a form that can be perceived by a visually impaired user. Such converters may be used to enable the visually impaired to access information in books or other documents containing text.

One type of document is currency. In many countries, particularly the United States, all bills of currency are essentially the same size, regardless of denomination. As a result, without an assistive device that can read information printed on a bill, a visually impaired person would be unable to determine the denomination of the bill. Accordingly, currency readers that can recognize and produce a non-visual output indicating a denomination of a bill are known.

SUMMARY

An improved, compact assistive reading device is provided.

In one aspect, the invention relates to a compact apparatus for close-range imaging of an object. The apparatus has a support structure defining an imaging area. A surface with a pin-hole aperture is also supported by the support structure. An imaging array is supported by the support structure such that the surface is positioned with the pin-hole aperture disposed in an optical path between the imaging area and the imaging array. The imaging array is spaced from the imaging area by a distance of less than 25 mm, and at least 100 mm$^2$ of the imaging area is focused on the imaging array through the pin-hole aperture. As an example, the separation could be on the order of 15 mm.

In another aspect, the invention relates to a compact apparatus for close-range imaging of an object. The apparatus has a housing having dimensions of less than 100 mm in length, 20 mm in height and 50 mm in width. An imaging array and a planar imaging area are mechanically coupled to the housing. A planar surface having a pin hole aperture is also mechanically coupled to the housing in an optical path between the imaging area and the imaging array.

In another aspect, the invention relates to a method of processing an image representing a bill of currency to detect a non-printed border region. The method may be performed with a processor and includes forming an array of values in a memory coupled to the processor. The values in the array represent successive linear regions parallel to and offset from a side of the image. Each value represents a number of edge points in a respective linear region. As part of the method a value in the array that represents a linear region closest to the side that is above a threshold is identified as a presumptive boundary between a non-printed and printed border region.

The identified non-printed border region may be omitted from the image when processing is performed to identify a denomination of a bill of currency depicted in the image. In some embodiments, this presumptive boundary may be tested to ensure that pixels falling in the presumed non-printed border region can be reliably identified as representing non-printed portions. When a reliable determination is not made, the border region is assumed to be non-existent, which may increase the amount of processing required on the image, but does not degrade accuracy.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is a schematic illustration of the currency reader of FIG. 1B with the bill inserted for reading and the housing shown in outline form;

FIG. 2B is a side view of the currency reader illustrated in FIG. 2A;

FIG. 2C is a sketch of an optical position sensor used to detect the position of the bill of currency in the currency reader of FIG. 2A;

FIG. 5A is a cross section through the currency reader of FIG. 1A;

FIG. 5B is a different cross section through the currency reader of FIG. 1A;

FIG. 6A is a schematic illustration of an optical path in a compact assisted reading device employing a patterned reflector according to some embodiments of the invention;

FIG. 6B is a sketch of a patterned reflector that may be employed in an assistive reading device as illustrated in FIG. 6A;

DETAILED DESCRIPTION

Applicant has recognized and appreciated that available assistive reading devices can be improved by making such devices compact and easy for visually impaired users to operate. Applicant has further appreciated that an assistive reading device can be made compact through the use of an optical imaging system with a pin hole aperture. Such an optical system may be coupled to a processing system within a compact housing formed with simple input and output devices that make the device easy to operate.

In embodiments in which the assistive reading device reads currency, the housing may be shaped to aid a visually impaired person position a portion of a bill in an imaging area. With a bill properly positioned in the imaging area, the currency reader may acquire and process an image of at least a portion of the bill from which the denomination of the bill can be recognized.

The device may have one or more output devices, such as a speaker or mechanical vibrator, to allow a recognized denomination of a bill to be presented in a audible, tactile or other non-visual format. An output device may also be used to communicate device status, such as to indicate that the device is on or off or that a bill has been correctly positioned in the device for reading.

The device also may have an input device or devices that can be simply operated to allow the user to input commands to control the device, such as commands to power on the device or to provide or repeat an output indicating a denomination of a bill. The input device may also allow a user to provide commands that control the form of the output, such as to turn on or off specific output devices so as to switch between output modes. Other commands may change the volume or intensity of an output indicator, regardless of the output mode used.

FIG. 1 illustrates as an example of a compact assistive reading device a currency reader 100. Currency reader 100 has a compact form factor, providing an overall size suitable for carrying the device in a user's pocket. In some embodiments, the currency reader will have a width, W, of a 100 millimeters or less, a length, L, of 50 millimeters or less and a height, H, of 20 millimeters or less. In the embodiment illustrated, currency reader 100 has dimensions of approximately 74 millimeters by 40 millimeters by 18 millimeters.

Housing 110 encloses and acts as a support structure for components, such as an optical imaging system and processing components. Additionally, housing 110 may support one or more input devices or more output devices.

Housing 110 may be constructed of any suitable material or materials. These materials may be formed into one or more members, suitably shaped to form housing 110 using any suitable construction techniques. In the embodiment illustrated, some or all of the components of housing 110 may be molded from plastic using known molding techniques.

Figure 1A:
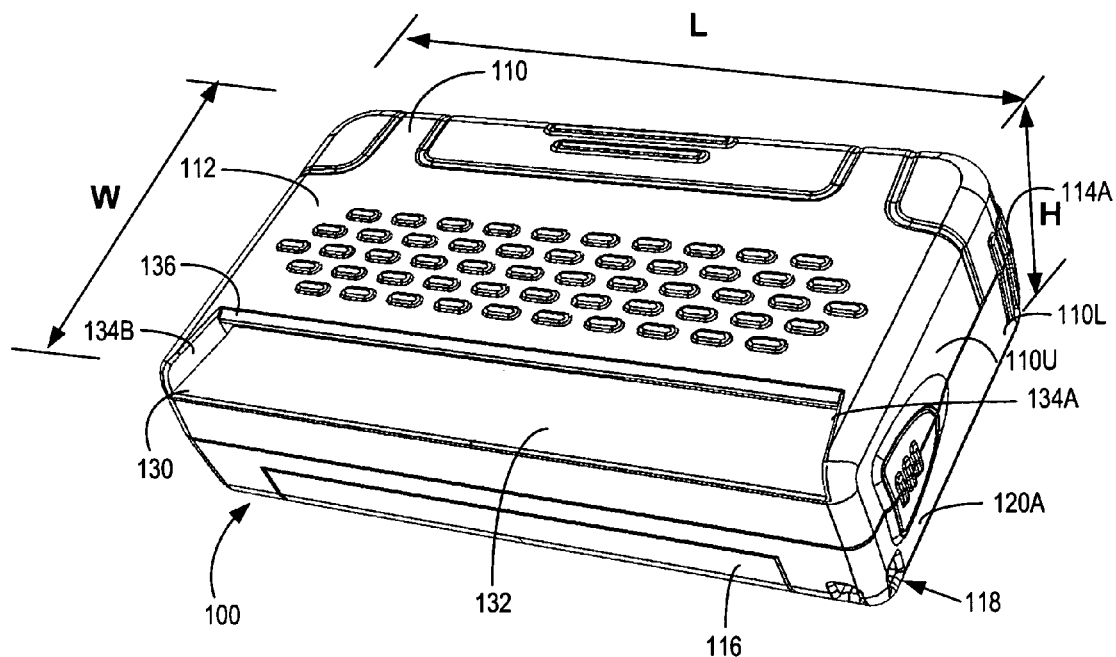
FIG. 1A is a sketch of a currency reader according to some embodiments of the invention.

The members of housing 110 may be provided with features that facilitate a visually impaired user firmly grasping currency reader 100 and/or appropriately orienting currency reader 100 for use. For example, textured gripping surface 112 may be formed with a plurality of bumps or projections that can be easily felt by a user. Accordingly, textured gripping surface 112 provides a mechanism for a visually impaired user to identify the top surface of currency reader 100. Similarly textured gripping corners, of which textured gripping corner 114A is visible in FIG. 1A and textured gripping corner 114B visible in FIG. 1B, may also be included. As can be seen in FIG. 1A, textured gripping corner 114A includes multiple bumps or projections that can be felt by a visually impaired user, allowing the user to identify the rear corners of currency reader 100 by touch.

Textured surfaces, such as textured gripping surface 112 and textured gripping corners 114A and 114B may be formed of the same material used in forming other members of housing 110. In some embodiments, the textured surfaces may be integral with other portions of the housing. However, in other embodiments, the textured surfaces may be formed of or coated with materials that enhance gripping of currency reader 100. For example, gripping surfaces may be formed with rubberized plastic or may be coated with rubber, vinyl or other relatively soft material that facilitates gripping. Though, the materials used are not critical in the invention and any suitable materials may be used and formed into textured surfaces in any suitable way.

Housing 110 may also contain other features. For example, FIG. 1A illustrates a hole 118 through a corner of housing 110. Hole 118 may be sized for attaching currency reader 100 to another member, such as a keychain or a lanyard. By attaching currency reader 100 to such a member, a user may readily carry or locate currency reader 100.

In the embodiment illustrated, housing 110 is formed from at least two members, an upper member 110U and a lower member 110L. These members may be held together in any suitable fashion. For example, upper housing member 110U and lower housing member 110L may be held together with screws, adhesive and/or snap fit features. Forming housing 110 of multiple members allows currency reader 100 to be assembled by placing an optical imaging system and processing components inside housing 110 and then fixing upper housing member 110U to lower housing member 100L. However, any suitable construction techniques may be used.

In the embodiment illustrated, housing 110 is formed from at least a third member. In the example illustrated in FIG. 1A, housing 110 also includes battery compartment cover 116. Battery compartment cover 116 may be removably connected to other components of housing 110, thereby allowing a battery to be installed within currency reader 100 after it is manufactured to provide power for operation of the device. Though, any suitable mechanism for supplying power may be used.

Figure 4A:
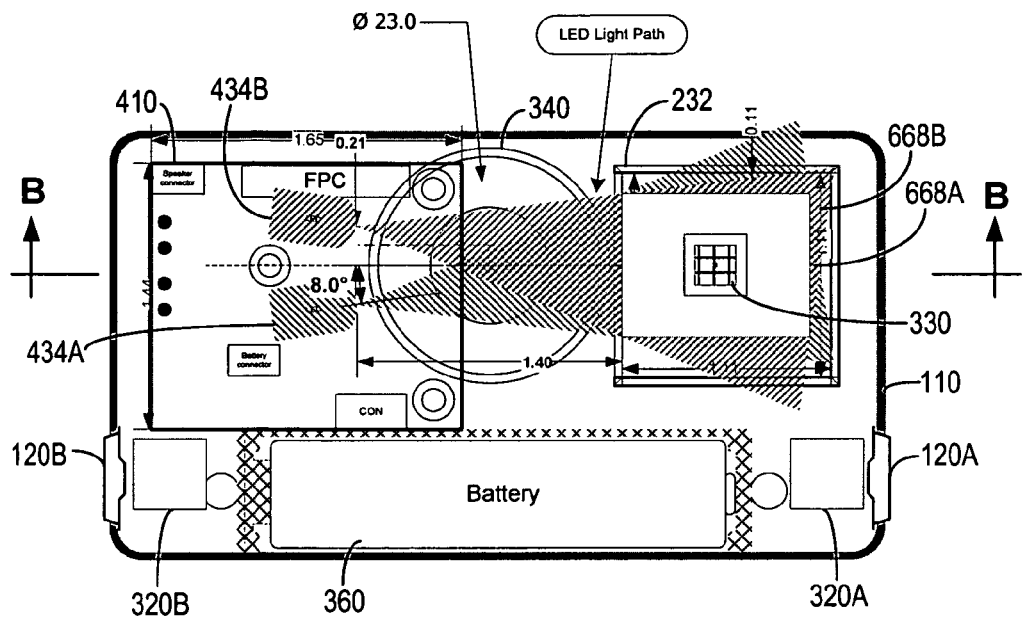
FIG. 4A is a top view, partially cut away, of the currency reader of FIG. 1A.

In addition to enclosing the optical imaging system and processing components, housing 110 is adapted for receiving a bill of currency and to support user input devices. In the embodiment illustrated, currency reader 100 includes user input devices that are easy for a visually impaired user to correctly actuate. In the embodiment illustrated, the user input devices consist of two buttons, 120A and 120B (FIG. 4A). In the embodiment of FIG. 1A, buttons 120A and 120B are positioned in opposing side surfaces of housing 110. Also as illustrated in FIG. 1A, each of the buttons has a textured surface, allowing a visually impaired user to locate the button tactilely. In the embodiment illustrated, each button 120A and 120B performs the same function when pressed, such that a user need not differentiate between button 120A and 120B to operate currency reader 100. Rather, a user may input different commands to currency reader 100 based on the number of buttons pressed. In this way, a user may input multiple commands to control currency reader 100 to perform multiple functions through a relatively simple user interface.

As a specific example, depressing either button 120A or 120B may be interpreted by processing components within currency reader 100 as a command to initiate a process of determining a denomination of a bill inserted into currency reader 100. Pressing both buttons 120A and 120B simultaneously may be interpreted by the processing components as a command to turn on the device or to change a level of the output. For audible outputs, depressing both buttons may alter the volume of the output. For example, currency reader 100 may be configured to operate according to one of a set of possible volume levels. Each time buttons 120A and 120B are pressed together, the device may switch to the next lowest volume level. The volume levels may be arranged cyclically such that when both buttons 120A and 120B are depressed while the currency reader 100 is already in the lowest volume level, currency reader 100 may respond by transitioning to the highest volume level.

In embodiments in which currency reader 100 supports multiple output modes, the simple push-button interface may be used both to change output levels and output modes. As an example, the output levels may include a mix of volume levels and intensity levels for a mechanical vibrator output device. In such embodiments, depressing both buttons 120A and 120B when the currency reader 100 is already operating in the lowest volume setting may result in the device switching to an operating mode in which outputs are represented by vibration pulses of the device. As with volume output levels, multiple vibration output levels could also be defined. In such an embodiment, depressing buttons 120A and 120B while the currency reader 100 is already in a vibratory output mode may result in a decrease in the intensity of the vibration pulses.

Regardless of the manner in which a user inputs a command indicating that the denomination of a bill is to be read, to use the device, a user inserts a bill of currency into currency reader 100. With the bill in the device, the user may input a command, such as by activating one of buttons 120A and 120B, to specify that currency reader 100 should read the denomination of the bill and produce a non-visual output indicating that denomination.

For currency reader 100 to read the denomination of a bill, a feature of the bill indicative of its denomination is positioned within currency reader 100 in an imaging area of an optical imaging system. To facilitate such positioning of a bill, housing 110 is formed with a slot 130 sized to receive a bill of currency and guide at least a portion of the bill into an imaging area.

Figure 1B:
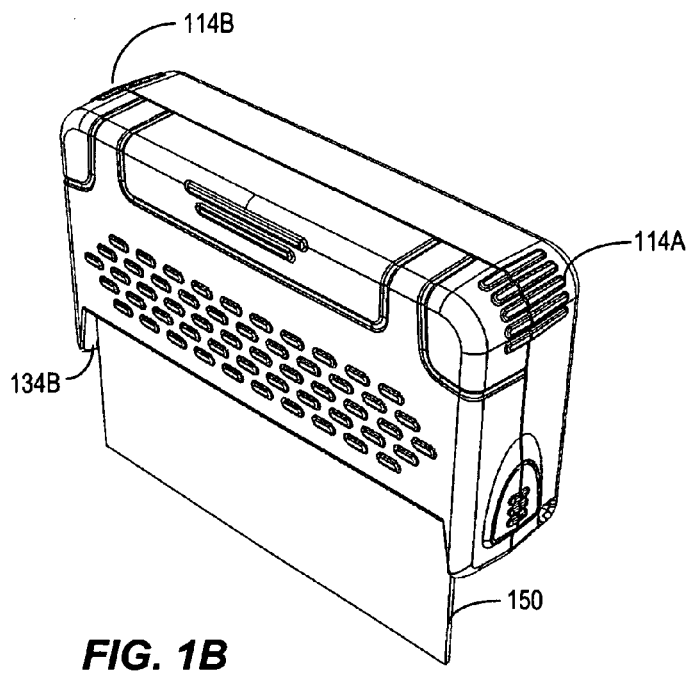
FIG. 1B is a sketch of the currency reader of FIG. 1A with a bill of currency inserted for reading.

As illustrated in FIG. 1A, slot 130 may be shaped to facilitate insertion of a bill of currency by a visually impaired user. As shown, slot 130 has a protruding floor 132, forming a shelf on which a user may rest a forward edge of a bill of currency. With the bill of currency resting on floor 132, a user may push it towards the rear of housing 110, forcing the front edge of the bill of currency under upper edge 136. Once the forward edge of the bill of currency is under upper edge 136, the forward edge is fully enclosed within slot 130 and, as the user presses the bill further towards the rear edge of housing 110, the bill will be guided into position in the imaging area of the optical imaging system within housing 110. FIG. 1B illustrates a bill of currency 150 inserted into slot 130.

To further facilitate insertion of a bill of currency, side walls 134A and 134B in the areas adjacent floor 132 are tapered. As can be seen in FIG. 1A, the tapering of sidewalls 134A and 134B creates a wider opening to slot 130 at the forward edge of floor 132 than adjacent to upper edge 136. This tapering facilitates placement of the forward edge of a bill of currency against floor 132 while constraining the position of the bill of currency when it is fully inserted into slot 130. Though, it should be appreciated that, while the structure illustrated of slot 130 facilitates use of currency reader 100 by a visually impaired user, any suitable mechanism for receiving a bill of currency may be used.

In some embodiments, insertion of a bill of currency into an assistive reading device may cause the device to power on. Such an embodiment may be implemented, for example, by incorporating a sensor adjacent the opening of slot 130. Such a sensor may be implemented as a switch, capacitive sensor, magnetic sensor or other suitable type of sensor. When the sensor detects the presence of a bill in slot 130, it may power up the device, preparing the device to recognize a denomination of a bill without requiring a user to expressly power on the device. Though, in some embodiments, the device does not attempt to recognize that a bill is improperly inserted into the device, which may be ascertained from one or more position sensors within the device. Audible tones may be used to provide feedback to a user by indicating when a bill is detected in slot 130 and whether the bill is properly positioned for imaging a predetermined area of the bill. In embodiments in which a sensor is included to detect the presence of a bill, a recognition process may begin automatically once the bill is determined to be properly positioned.

FIG. 2A schematically illustrates bill 150 positioned within slot 130 in housing 110. As can be seen in FIG. 2A, each corner of bill 150, such as corners 252A and 252B, contains a numerical designation of the denomination of bill 150. Though not shown in FIG. 2A, within housing 110 an optical imaging system is positioned relative to slot 130 such that, when bill 150 is fully inserted into slot 130 a corner of bill 150 will be adjacent an imaging area of the optical imaging system. In this way, a corner of bill 150 including a numerical designation of the denomination of the bill will be in the imaging area of the optical imaging system when the bill 150 is fully inserted in slot 130. Though, it should be appreciated that the portion of the bill in the imaging area need not include a numerical designation. Any portion of the bill that has recognizable characteristics may be placed in the imaging area and the denomination of the bill may be determined based on matching that portion of the bill to a template associated with a specific bill denomination or otherwise determining that the characteristics are present in the imaging area.

In the embodiment illustrated, currency reader 100 includes one or more position sensors that can detect the position of bill 150 and ascertain when it is fully inserted into slot 130. The outputs of the position sensors may be used in any suitable way. For example, the position sensors may be coupled to processing components within currency reader 100 and used to trigger a process of reading the denomination of bill 150. The processing components, for example, may capture an image of the imaging area in response to an indication from the position sensors that bill 150 is fully inserted into slot 130 (FIG. 1). Alternatively, processing components may output an indication to a user that bill 150 has been properly positioned within slot 130 in response to the outputs of the position sensors. Such an output indication may prompt a user to activate input devices for currency reader 100 that cause the processing components to capture an image and identify a denomination of bill 150. As a further alternative, the outputs of the position sensors may be used to generate an output that serves as a warning to a user that the bill is not properly positioned in the housing when the user inputs a command to read the denomination of the bill. Thus, the specific manner in which the outputs of position sensors are used as part of a process of reading a denomination of bill 150 is not critical to the invention and they may be used in any suitable way.

In the embodiment illustrated in FIG. 2A, three position sensors, position sensors 210A, 210B and 210C, are included within currency reader 100. Each position sensor is mounted within housing 110 such that it will be adjacent an edge of bill 150 when bill 150 is correctly positioned within slot 130 (FIG. 1A).

As illustrated, position sensor 210A is mounted within housing 110 in a location that corresponds with a side edge of bill 150 when the bill is correctly inserted into slot 130. Position sensors 210B and 210C are mounted within housing 110 such that they will detect the forward edge of bill 150 when the bill is properly inserted into slot 130. With this mounting of position sensors 210A, 210B and 210C, when all three sensors output an indication of the presence of bill 150, processing components in currency reader 100 can determine that bill 150 is properly positioned for reading.

In the embodiment illustrated in FIGS. 2A and 2B, position sensors 210A and 210B and 210C may be optical position sensors. FIG. 2C illustrates a possible instruction of such optical position sensors. Each position sensor may include a light source 212 and a light sensor 214. As an example, light source 212 may be a light emitting diode (LED) and light sensor 214 may be a photo transistor. However, any suitable components may be used as a light source and/or a light sensor, including, as one example, an optical fiber guide that directs light to the primary imaging array rather than dedicated light sensors.

As shown, light source 212 may be directed at a smooth surface of housing 110. Light sensor 214 may be directed generally at the same location of housing 110. When no bill is present, light from light source 212 reflects from the smooth surface of housing 100 and is detected by light sensor 214. If a bill 150 is present in slot 130, less light will reflect from the bill than reflects from the surface of housing 110. Accordingly, the amount of light measured by sensor 214 decreases when a bill is inserted between sensor 210 and housing 110. Processing components coupled to position sensor 210 may, therefore, detect the presence of a bill positioned within slot 130 based on the level of light sensed by light sensor 214. Though, any suitable position sensors may be used, including, for example, electromechanical switches, capacitive sensors or magnetic sensors.

Regardless of the type of position sensors used, the position sensors may be arranged within the housing to detect when the bill is in position for reading the denomination of the bill. In the example illustrated, when bill 150 is properly positioned, corner 252A is positioned in an imaging area 230 of an optical system within housing 110. FIG. 2B shows this positioning.

FIG. 2B illustrates housing 110 from the prospective of line B-B in FIG. 2A. In FIG. 2B, housing 110 is shown in outline form to reveal the positioning of some of the components inside housing 110.

FIG. 2B illustrates that the floor of slot 130 under upper edge 136 contains a transparent window 232. In the embodiment illustrated, transparent window 232 is formed of a transparent member, such as a plastic or glass sheet. However, any suitable material may be used to form window 232, and in some embodiments, a transparent window may be formed as an opening within the material used to form housing 110 without any member inserted in the opening.

Regardless of the material used to form window 232, window 232 provides an imaging area 230 for an optical system within housing 110. In the embodiment illustrated, window 232 is positioned such that corner 252A of bill 150 is positioned in imaging area 230 when bill 150 is properly aligned within slot 130.

In the embodiment illustrated, a compact optical system is formed using a pin hole aperture. Such an optical system may include an aperture plate 220 containing a pin hole aperture 224. The pin hole aperture 224 may be between imaging area 230 and an imaging array 222. In this way, an image of an object, such as the corner of a bill 150, within imaging area 230 may be focused on an imaging array 222. Imaging array 222 may then capture an image of the object for further processing.

Imaging array 222 may be an imaging array as is known in the art. For example, imaging array 222 may be an array of charge coupled devices that can be connected to other processing components within currency reader 100. However, a CMOS sensor array or any other suitable form of imaging array may be used.

Figure 3:
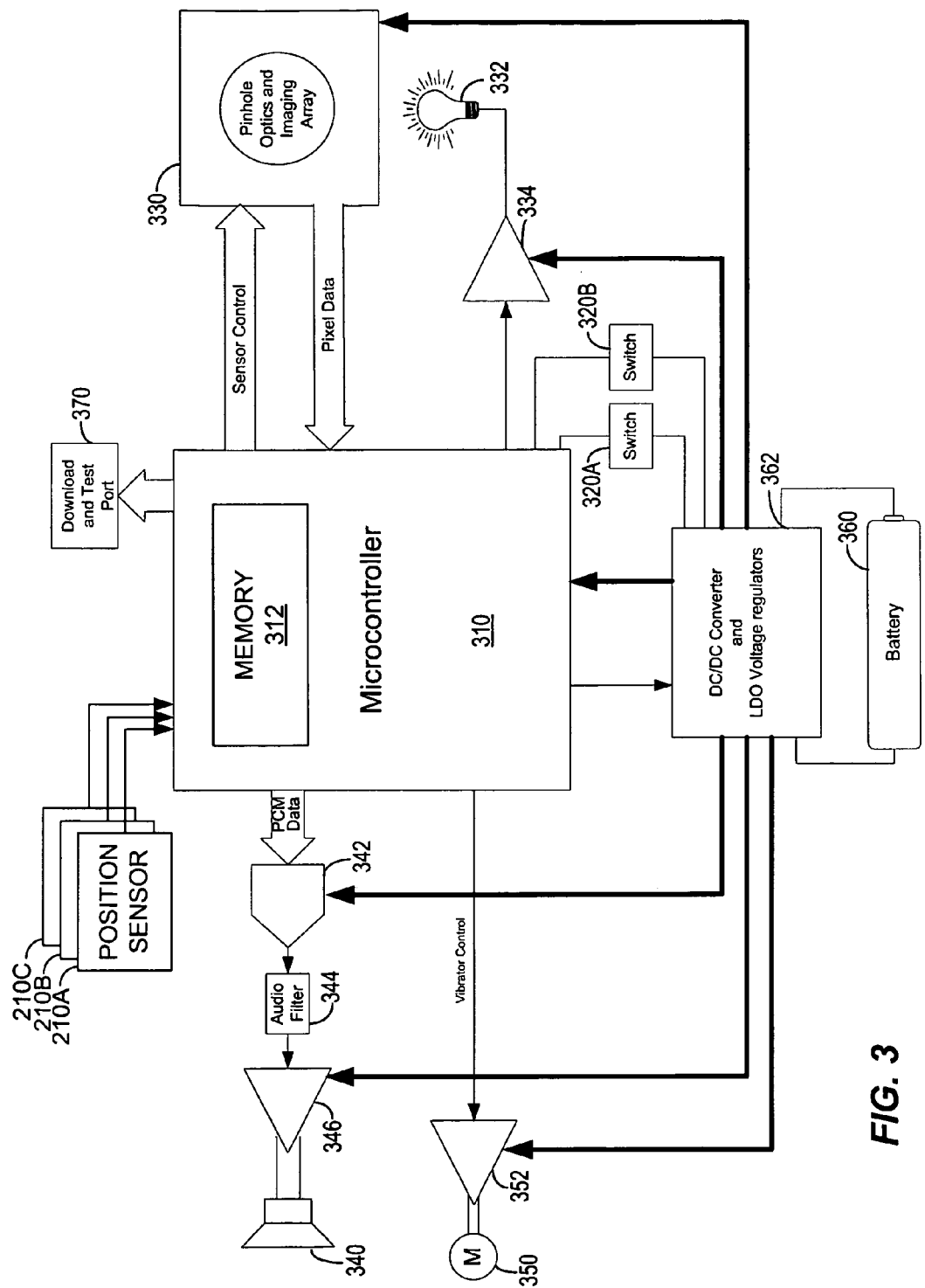
FIG. 3 is a circuit schematic illustration of components of the currency reader of FIG. 1A.

Turning to FIG. 3, a schematic illustration of components of currency reader 100 is provided. In the embodiment illustrated, processing is provided in a processor, such as microcontroller 310. As illustrated, microcontroller 310 includes embedded memory 312 in which a program may be stored. The program may control microcontroller 310 and, hence, other components of currency reader 100, to perform operations that result in determining denomination of a bill of currency.

As shown, microcontroller 310 is coupled to position sensors 210A, 210B and 210C. As a result of these connections, a program stored in memory 312 may include conditional operations that depend on whether position sensors 210A, 210B and 210C produce outputs indicating that a bill is properly positioned within slot 130. This conditional operation may include, for example, outputting a warning to a user that a bill is not properly positioned when the user inputs a command to read the denomination of a bill. Alternatively, these conditional operations may include triggering a process that captures an image of at least a portion of a bill inserted into slot 130 when the outputs of position sensors 210A, 210B and 210C indicate that the bill is properly positioned.

The program for microcontroller 310 may also include conditional operations that are based on user inputs. As shown in FIG. 3, switches 320A and 320B are also coupled to microcontroller 310. Switches 320A and 320B are positioned behind buttons 120A and 120B, respectively. Accordingly, when a button 120A or 120B is depressed by a user, its corresponding switch will momentarily change state, producing a signal that can be detected by microcontroller 310. In this way, microcontroller 310 may be programmed to respond to user inputs through buttons 120A and 120B.

FIG. 3 also indicates that imaging unit 330 is coupled to microcontroller 310. Image unit 330 may include imaging array 222 on which an image of corner 252A is focused by pin hole aperture 224 (FIG. 2B). The connections between microcontroller 310 and image unit 330 may include both control and data paths. Using these paths, when microcontroller 310 determines, based on the signals received from switches 320A or 320B and signals from position detectors 210A, 210B and 210C that the denomination of a bill is to be read, microcontroller 310 may generate outputs acting as control inputs to image unit 330. These control inputs may cause imaging array 224 to capture an image and output data representing the pixels of that image to microcontroller 310.

Microcontroller 310 may perform one or more algorithms on that image data to determine the denomination of the bill inserted into slot 130 (FIG. 1A). Such processing may be performed in any suitable way. In some embodiments, a denomination may be detected by performing a cross correlation between groups of pixels in the captured image and prestored set of templates representing unique patterns printed on currency of specific denominations. In some instances, the unique patterns may include all or a portion of a numeral representing a denomination of the bill. Though, it is not a requirement that the pattern be a numerical indicator. A template in the set with a high cross correlation to the captured image may be regarded as matching the denomination of the bill. In this way, the denomination associated with the matching template may be output to a user as the denomination of the bill.

Regardless of the specific mechanism used to determine the denomination, the determined denomination may be output to the user through any one or more suitable output devices. In the embodiment shown in FIG. 3, two output devices are illustrated, speaker 340 and mechanical vibrator 350. Here, speaker 340 is used to output an audible indication of the recognized denomination. Vibrator 350 is used to cause currency reader 100 to vibrate in pulses, with the pattern of pulses signaling the determined denomination. For example, one pulse may signal a one dollar bill; two pulses may signal a 2 dollar bill; three pulses may signal a five dollar bill; etc. However, any suitable pattern of pulses may be used.

To generate the vibration pulses, currency reader 100 may include a driver 352 that powers vibrator 350 in response to a control signal generated by microcontroller 310. Driver 352 and vibrator 350 may be components as known in the art. Though, any suitable components may be used.

The audible output produced by speaker 340 may likewise be in the form of a series of pulses—though audible. Speaker 340 may output a series of blips or other sounds representing the detected denomination of a bill. Though, an audible output may be encoded in other ways to signify the denomination of a bill. For example, tones of different frequency may signal different denominations. In other embodiments, speaker 340 may output an indication of the detected denomination using synthesized speech. In such an embodiment, microcontroller 310 may be programmed to output a signal that, when applied to speaker 340, produces speech.

In the embodiment illustrated, microcontroller 310 outputs a stream of digital bits using pulse code modulation. That stream of bits is applied to digital-to-analog converter 342. The output of digital-to-analog converter 342 is filtered in audio filter 344 and applied to an audio amplifier 346. As shown, audio amplifier 346 drives speaker 340. In this way, by appropriately programming microcontroller 310 to generate a digital stream in a suitable pattern, the format of the audio output may be controlled.

Microcontroller 310 may also be programmed to perform other operations associated with reading denomination of a bill. For example, currency reader 100 may include a source of illumination 332 directed at imaging area 230 (FIG. 2B). To conserve power, illumination source 332 may be turned on only when imaging array 222 is to capture an image. Accordingly, illumination source 332 may be coupled to microcontroller 310 through a driver 334. Driver 334 may be configured to only supply power to illumination source 332 when microcontroller 310 asserts a control line indicating that an image is to be captured.

Other components of currency reader 100 are also illustrated in FIG. 3. Power for operation of the electronic components may be supplied by a battery 360. Appropriate power levels may be supplied through a voltage converter 362. As shown, voltage converter 362 provides power from battery 360 to microcontroller 310, switches 320A and 320B, imaging array 330, driver 334, digital-to-analog converter 342, amplifier 346 and driver 352.

FIG. 3 also illustrates a download and test port 370 may be included. Such a port may allow a program to be downloaded into memory 312. Such a port may also allow test signals to be coupled to and from microcontroller 310 to test operation of currency reader 100.

The circuitry illustrated in FIG. 3 may be implemented using commercially-available electronic components. However, the circuitry may be implemented in an Application Specific Integrated Circuit (ASIC) or a programmable device, such as a gate array. Accordingly, any suitable components may be used.

In some embodiments, the components may be packaged to facilitate compact construction of currency reader 100. As an example, multiple components illustrated in FIG. 3 may be fabricated on a single printed circuit board. For example, microcontroller 310, driver 334, digital-to-analog converter 342, audio filter 344, amplifier 346 and voltage converter 362 may be attached to and interconnected through the printed circuit board. Other components may be mounted to other locations within housing 110 and interconnected to the printed circuit board using wires, flex circuits or other suitable means.

FIG. 4A shows a possible layout of such components to achieve a compact arrangement. In FIG. 4A, housing 110 is shown in outline form. Printed circuit board 410 is shown mounted in one corner of housing 110. As shown, speaker 340 is mounted to a floor of housing 110. As shown, switches 320A and 320B are positioned adjacent buttons 120A and 120B. A possible position for battery 360 is also illustrated.

As can be seen, imaging unit 330 is positioned to align with window 232. Illumination source 332 is positioned to illuminate window 232. Though any suitable positioning may be used, in the embodiment illustrated, the illumination source is placed outside the field of view of the imaging unit. The inventor has recognized and appreciated that this positioning limits reflection of the light source from the window, reducing interference with the image. By reducing interference, the recognition task may be simpler and more accurate. In the embodiment illustrated in FIG. 4A, illumination source 334 is implemented as two light emitting diodes, LED 434A and 434B.

Figure 4B:
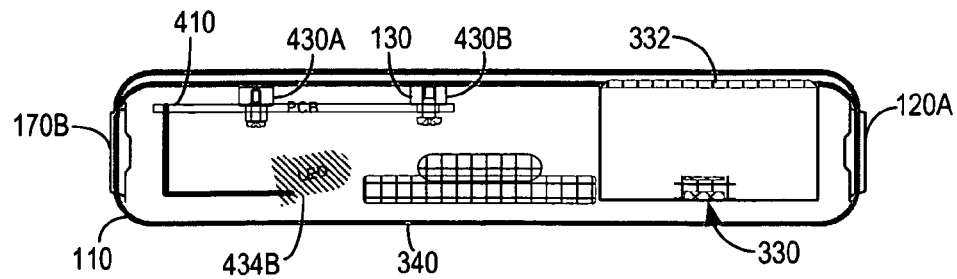
FIG. 4B is a cross sectional view, partially cut away, along the line B-B of FIG. 4A.

FIG. 4B shows the structure of FIG. 4A from the perspective of line B-B in FIG. 4A. As can be seen in FIG. 4B, printed circuit board 410 is mounted, such as through mounting members 430A and 430B, to a top surface of currency reader 100. Speaker 340 is mounted to a lower surface. This mounting leaves a space through which light from LEDs 434A and 434B may pass to reach window 232.

FIG. 5A provides an alternative view of components inside housing 110 of currency reader 100. FIG. 5A shows a cross section through currency reader 100. In the embodiment illustrated in FIG. 5A, window 232 is set back from the surface of housing 110 defining slot 130, creating a recess 530. Recess 530 prevents a bill 150 from sliding across an upper surface of window 232 when inserted in slot 130. Accordingly, recess 530 may improve the accuracy of currency reader 100 by preventing scratching of window 232 by contaminants on bill 150. By avoiding scratches or other contamination of window 232, a more accurate image of bill 150 may be captured.

FIG. 5A also illustrates a further feature that may be incorporated to improve the accuracy of currency reader 100. As illustrated, a patterned reflector is included adjacent window 232. Patterned reflector 520 is positioned to reflect light from LEDs 434A and 434B towards window 232. Patterned reflector 520 is positioned to compensate for uneven illumination across window 232 caused by LEDs 434A and 434B being positioned to illuminate window 232 from an oblique angle.

As shown, LEDs 434A and 434B will provide greater direct illumination at the side of window 232 closest to LEDs 434A and 434B. Patterned reflector 520 is positioned to reflect light to preferentially illuminate the side of window 232 that is farthest from LEDs 434A and 434B. In this way, the combination of illumination directly from LEDs 434A and 434B and illumination reflected from patterned reflector 520 may be relatively constant across window 232.

FIG. 5B shows a cross section of currency reader 100 similar to that shown in FIG. 5A. The cross section of FIG. 5B differs from that in FIG. 5A and that it is taken through a different section of currency reader 100.

FIG. 6A illustrates operation of the patterned reflector 520. As shown, LEDs 434A and 434B are positioned at an oblique angle relative to window 232 behind which an object, such as bill 150 is positioned. As can be seen, the rays of light from LEDs 434A and 434B that illuminate different portions of window 232 can have different properties, tending to cause variations in illumination across window 232. For example, ray 660A illuminating the edge of window 232 closest the LEDs 434A and 434B travels a shorter distance and strikes window 232 at a less oblique angle than ray 660B that illuminates the farther edge of window 232. In such a configuration, ray 660B may provide less intense illumination than ray 660A.

To compensate for differences in direct illumination, patterned reflector 620 is positioned such that a portion of the light emitted by LEDs 434A and 434B strikes patterned reflector 620 and is reflected, such as in ray 662 towards window 232. The combination of illumination directly from LEDs 434A and 434B and that reflected from patterned reflector 620 combines to provide a more uniform illumination of window 232 than could be provided by light from LEDs 434A and 434B alone.

As shown, the patterned reflector 620 can compensate, at least partially, for variations in illumination across window 232 based on distance from LEDs 434A and 434B. In addition to variations in illumination associated with distance, variation in illumination may also occur across window 232 as a result of angular direction. For example, FIG. 4A shows beams from LEDs 434A and 434B illuminating window 232. Points 668A and 668B are both at substantially the same distance from the source of illumination. However, point 668A is closer to the beam center than point 668B. Accordingly, illumination at point 668A may be more intense than at point 668B.

To compensate for this difference in intensity based on angular direction, patterned reflector 620 may have a pattern that reflects different amounts of light, depending on the angle relative to the beams emitted by LEDs 434A and 434B. FIG. 6B illustrates a possible pattern. FIG. 6B shows a front view of patterned reflector 620, which is in contrast to the side view in FIG. 6A. As shown, patterned reflector 620 has different reflectivity at different locations on its surface. This pattern of reflectivity may be selected to provide more reflectivity at beam angles where less illumination is received and less reflectivity at beam angles where greater illumination is received. Accordingly, FIG. 6B illustrates that patterned reflector 620 has a central portion 670 that is less reflective than side portions 672 and 674. As shown, the amount of reflectivity may vary continuously across the surface of patterned reflector 620.

Though not expressly illustrated in FIG. 6B, other variations may be incorporated into the reflectivity pattern of patterned reflector 620 to compensate for other variations in the intensity of the illumination. For example, the reflectivity of patterned reflector 620 may vary across the surface of patterned reflector 620 from bottom 676 to top 678.

Enabling relatively uniform illumination from an oblique angle as illustrated in FIG. 6A allows for a compact design of an assistive reading device, particularly in combination with an optical imaging system incorporating a pinhole lens. As illustrated, an optical imaging system using a pinhole lens can provide a relatively large field of view that spans an angle, A. As a result, window 232 maybe in the field of view of the imaging system, even though imaging array 222 is spaced from window 232 by a distance $D_1$, which can be relatively small. Distance $D_1$ may be less than the height of currency reader 100, and in some embodiments may be a substantial factor in defining the height of the device.

Figure 7:
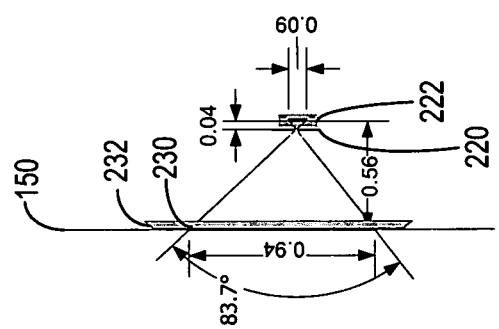
FIG. 7 is a sketch illustrating compact dimensions in an optical system of an exemplary embodiment of the currency reader of FIG. 1A.

FIG. 7 provides examples of dimensions of an optical imaging system employing a pinhole lens that may lead to a compact assistive reading device. In the example of FIG. 7, imaging area 230 is on the order of 1 in$^2$. As a specific example, FIG. 7 illustrates that imaging area 230 is 0.94 in. An imaging array 222 is on the order of 0.1 in$^2$. In a specific example of FIG. 7, the imaging array 222 is 0.09 in$^2$. As shown, imaging array 222 is separated from aperture plate 220 by a distance of 0.04 in. This separation provides a field of view in excess of 75 degrees. In the example of FIG. 7, the field of view is 83.7 degrees. With this field of view, an image of items in imaging area 230 may be focused on imaging array 222 with a separation between imaging area 230 and imaging array 222 on the order of one half in. In the example of FIG. 7, the separation $D_1$ 0.56 in.

Though the specific dimensions of FIG. 7 are illustrative rather than limiting of the invention, they demonstrate a suitable implementation of a compact assistive device.

Figure 8:
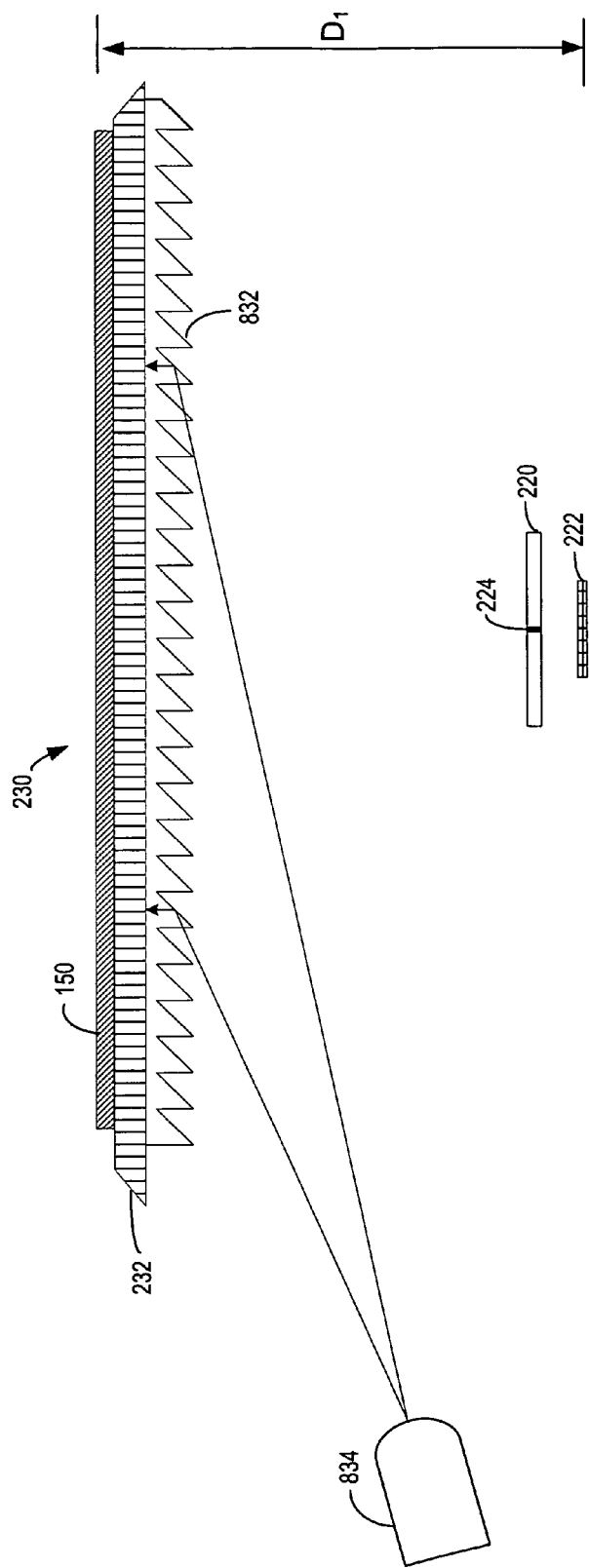
FIG. 8 is a schematic illustration of a compact assistive reading device employing a refractive element according to some embodiments of the invention.

FIG. 8 illustrates an alternative embodiment of imaging components in a compact assistive reading device. The embodiment of FIG. 8 includes a pinhole optical imaging system, which may be formed from an aperture plate 220 with a pinhole 224 focusing images of objects in an imaging area onto an imaging array 222. As in the embodiment of FIG. 6A, the imaging area 230 is illuminated from an oblique angle. In the example of FIG. 8, imaging area 230 is illuminated by a light emitting diode (LED) 834. Though, any suitable illumination source may be used.

As shown, LED 834 directs a beam of light generally at the center of imaging area 230. To increase the uniformity of illumination cross imaging area 230, a refractive element may be positioned in the path of the beam of light. A refractive element can redirect the beam of light from LED 834 to impinge on window 232 in a substantially perpendicular direction. With this incident angle, more of the light from LED 834 is directed into imaging area 230, increasing both the intensity and uniformity of the illumination across imaging area 230. In the embodiment illustrated, the refractive element is a prism film 832 applied to a lower a surface of window 232. Prism film is known in the art and suitable prism film may be commercial procured. However, any suitable refractive element may be used.

FIG. 8 does not illustrate a reflector perpendicular to window 232, such as pattern reflector 620 (FIG. 6A). However, a reflector may be incorporated into the design of FIG. 8 and that reflector may be patterned as illustrated in FIG. 6B or with any other suitable pattern to provide uniform illumination across imaging area 230.

Figure 9:
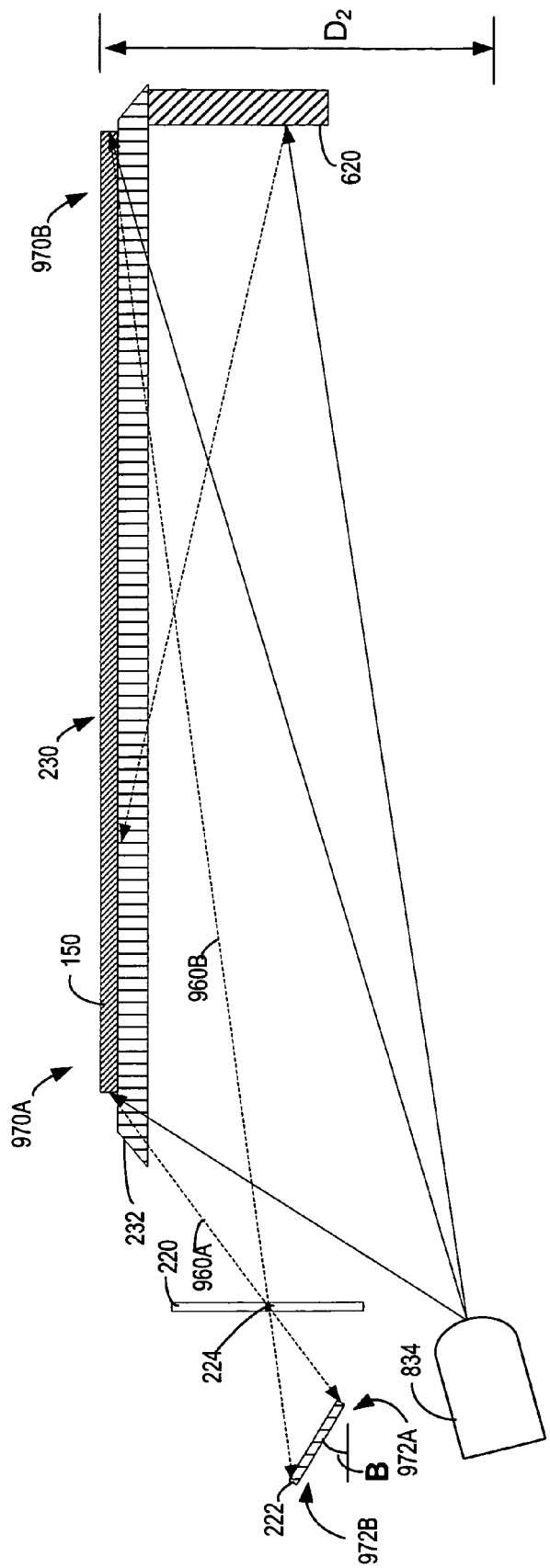
FIG. 9 is a schematic illustration of an alternative arrangement of components of an assistive reading device according to some embodiments of the invention.

FIG. 9 illustrates an alternative embodiment of an imaging system that may be employed in a compact assistive device. In the embodiments of FIG. 6A and FIG. 8, imaging array 222 is oriented parallel to window 232 defining imaging area 230. FIG. 9 illustrates an alternative embodiment in which imaging array 222 is also positioned at an oblique angle relative to imaging area 230.

Though not a requirement of the invention, in the embodiment illustrated in FIG. 9, aperture plate 220 is mounted perpendicular to window 232 defining imaging area 230. As shown, aperture plate 220 is positioned to the same side of imaging area 230 as LED 834. However, aperture plate 220 is positioned out of the path of a beam emanating from LED 834.

Imaging array 222 is positioned behind aperture plate 220 such that pinhole 224 in aperture plate 220 is in the optical path of light reflected from imaging area 230 that is focused by pinhole aperture 224. In the embodiment illustrated, imaging array 222 is mounted at an angle B. Mounting imaging array 222 at an angle can compensate for distortion caused by having the imaging array at an oblique angle.

For example, as illustrated in FIG. 9, a ray, such as ray 960A, reflected from a near portion of imaging area 230, such as region 970A, travels a relatively short distance to imaging array 222, which would tend to cause items in region 970A to appear larger than items in region 970B that are farther from imaging array 222. However, as can be seen from the path of 960B, representing a reflection from an object in region 970B, the tilt of imaging array 222 ensures that ray 960B has a longer path from pinhole 224 to imaging array 222 than does ray 960A. A longer path from the pinhole 224 to the imaging array 222 tends to introduce magnification into the image. Accordingly, the tilt angle B of imaging array 222 may be selected such that demagnification associated with objects in region 970B in comparison to objects in region in 970A is offset by the apparent magnification of objects imaged at region 972B of imaging array 222 relative to those objects imaged in region 972A. In this way, a relatively uniform magnification across imaging area 230 may be provided, which can facilitate accurate identification of objects in imaging area 230, even though the optical system is relatively compact.

In the embodiment of FIG. 9, placing imaging array 222 to the side, rather than parallel and facing window 232, may allow a decrease in the height of an assistive reading device. For example, FIG. 9 illustrates that the distance in the space dimension required to accommodate both an illumination source and imaging system is $D_2$. In some embodiments, the distance $D_2$ may be less than the distance $D_1$ (FIG. 8) when the imaging array is parallel to window 232.

Other than the positioning of aperture plate 220 and imaging array 222, the components used in forming the assistive reading device illustrated in FIG. 9 may be the same as described above in connection with the embodiments of FIG. 6A or FIG. 8. Though, any suitable components may be used.

Figure 10A:
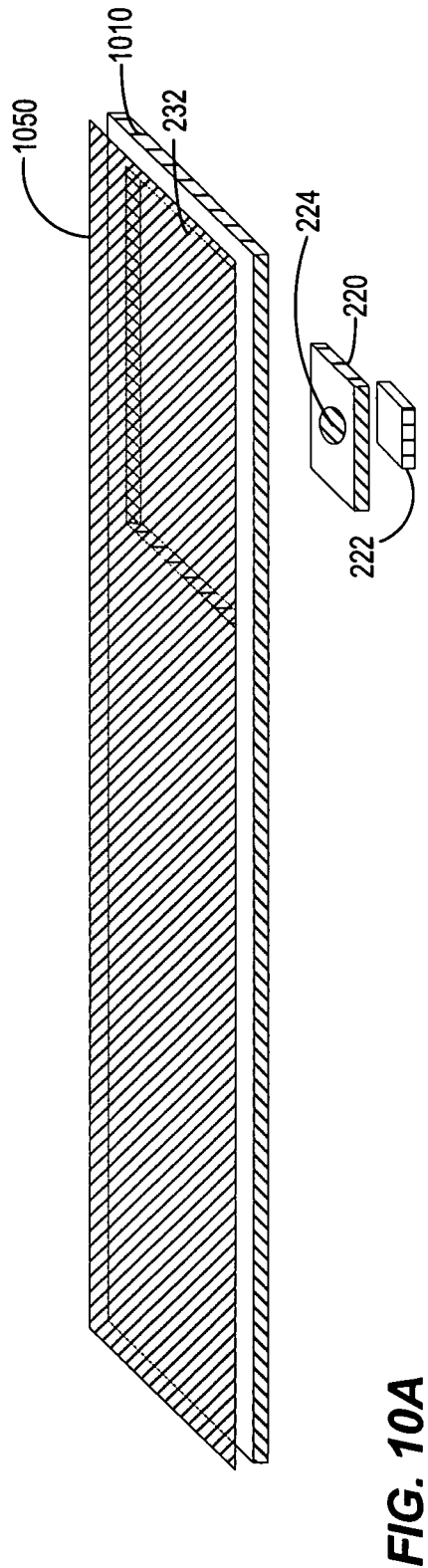
FIG. 10A is a sketch of an alternative embodiment of a compact assistive reading device incorporating pin hole optics according to some embodiments of the invention.

In the foregoing examples, principles for making a compact assistive reading device have been illustrated embodied in a currency reader. Though, the invention is not so limited. The invention may be employed for reading numbers or letters or recognizing other symbols on paper or other planar objects that may be placed in an imaging area. FIG. 10A illustrates a planar object 1050 placed on a housing 1010 with a window 232. Window 232 exposes a portion of object 1050, allowing an image of the portion to be focused by pinhole 224 onto imaging array 222. Processing of the image captured on imaging array 222 may be performed in components as described above in connection with FIG. 3. To accommodate processing of objects other than currency, the programs stored in memory 312 may, rather than recognizing indications of denominations of bills of currency, may be adapted to recognize text, numbers or other symbols that may appear on object 1050. Though any suitable processing components may be used.

Figure 10B:
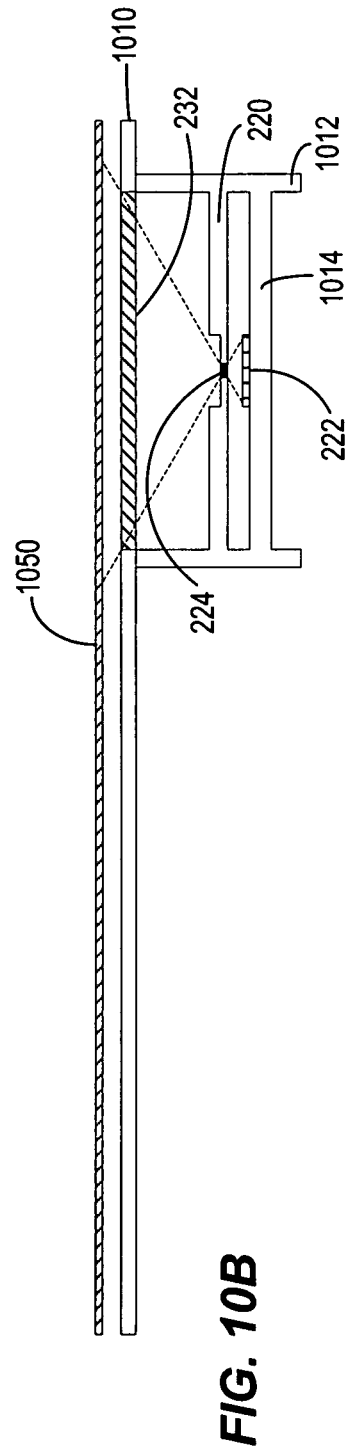
FIG. 10B is a cross sectional view of the assistive reading device illustrated in FIG. 10A.

FIG. 10B is a cross-sectional view of the embodiment of FIG. 10A. In the embodiment of FIG. 10A, portions of housing 1010 are not illustrated for clarity. In the embodiment of FIG. 10B, housing 1010 is illustrated as having members that position and support aperture plate 220 and imaging array 222 for appropriate imaging of the imaging area created by window 232. In the embodiment illustrated, housing 1010, in addition to having a surface in which window 232 is formed, contains members 1012 that define the position of aperture plate 220. Members 1012 may also define the position of a substrate 1014 that positions and supports imaging array 222. In the embodiment illustrated, the members of housing 1010 that position and support other components of the assistive reading device may be integrally formed with the member in which window 232 is formed. Such an embodiment may be implemented by forming the support members of housing 1010 in the same molding operation as the outer surfaces of the housing. However, it is not a requirement that the support members be integrally formed, and any suitable construction techniques may be used.

Figure 10C:
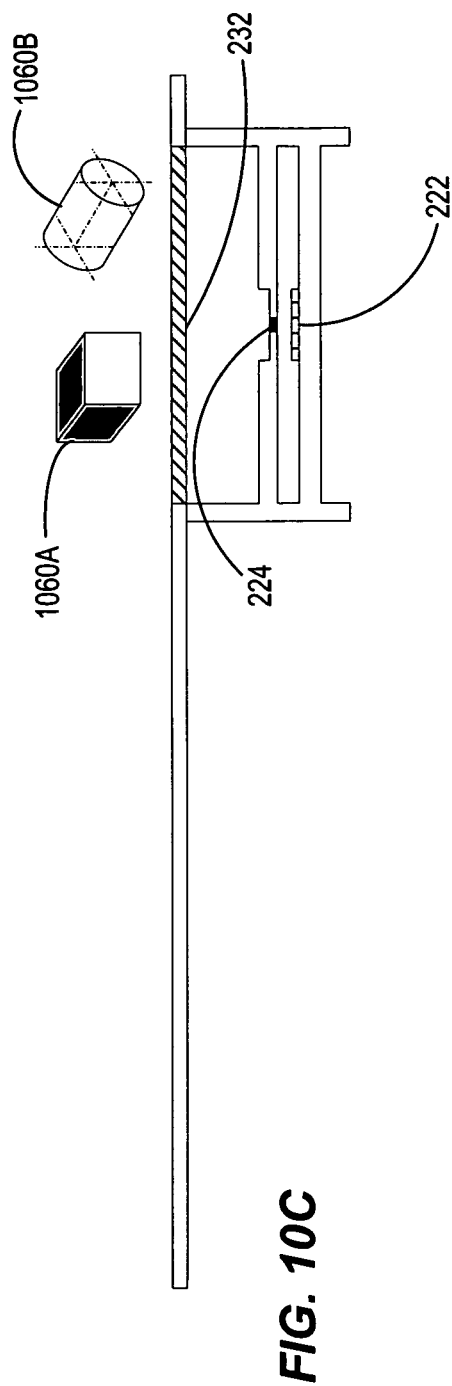
FIG. 10C is a cross sectional illustration of the assistive reading device of FIG. 10B in an alternative operating state.

FIG. 10C illustrates that the techniques for forming a compact assistive reading device are not limited to use in constructing assistive devices that read text, numbers or other symbols on flat objects, such as paper or bills of currency. FIG. 10C illustrates that three-dimensional objects, such as objects 1060A and 1060B, may be positioned in an imaging area adjacent to window 232 such that imaging array 222 may capture an image of those objects. Objects 1060A and 1060B may be objects such as pills or hearing aide batteries that contain text, numbers or symbols. Alternatively or additionally, the objects 1060A and 1060B may be shaped or have features that a visually impaired person may not be able to perceive without assistance. Though, an assistive device may be configured to recognize any suitable types of objects, including objects from mainstream use, other than objects a visually impaired person may seek to recognize. The images captured with imaging array 222 in the embodiment of FIG. 10C may be processed using components as illustrated in FIG. 3 or any other suitable components. Though, the program stored for micro-controller 310 maybe adapted to recognize characteristics of objects 1060A and 1060B. Those characteristics may include the shape, size, presence or absence of certain features, the orientation of the objects on window 232 or other suitable characteristics. The components of FIG. 3 may be adapted to output an indication of whether such characteristics are detected. Though, in some embodiments, a port, such as port 370 may be used to output an enlarged image of all or a selected portion of the objects. The image may be output in digital form and magnified for display on a separate display device.

Figure 11:
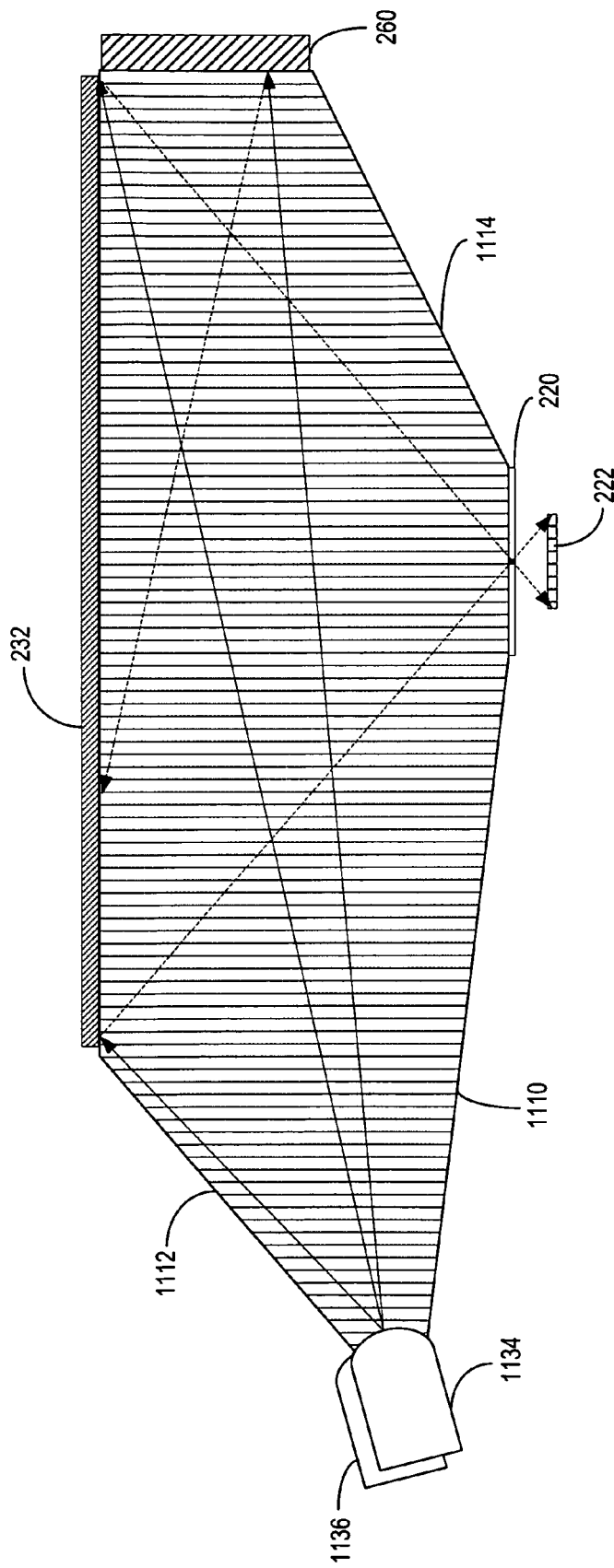
FIG. 11 is a schematic illustration of components in a compact assistive reading device employing a solid state optical chamber and light pipe according to some alternative embodiments of the invention.

FIG. 11 illustrates yet a further alternative embodiment of an assistive reading device using pinhole optics. As shown, the embodiment of FIG. 11 includes an aperture plate 220 and imaging array 222. In the embodiment of FIG. 11, a solid state optical chamber 1110 is positioned between the illumination source and window 232 defining the imaging area. Optical chamber 1110 acts as a light pipe to direct illumination from the illumination sources towards window 232.

As is known in the art, an optical chamber may be formed using solid state elements that have surfaces defining the boundaries of the optical chamber. The surfaces of the solid state elements are positioned relative to the source of illumination and also relative to materials of different refractive index such that light emanating from the illumination source is reflected from those surfaces towards its intended destination, here window 232. In the example of FIG. 11, optical chamber 1110 includes, for example, a surface 1112 positioned such that light from LED 1134 striking surface 1112 will be reflected towards window 232. Though, it is not a requirement that the surfaces of optical chamber 1110 directly reflect the light towards window 232. For example, light from LED 1134 may impinge on surface 1114 and be reflected to patterned reflector 260. From patterned reflector 260, the light may be reflected to window 232. Accordingly, many configurations of optical chamber 1110 are possible for providing suitable illumination across window 232.

FIG. 11 illustrates a further variation that is possible in some embodiments. FIG. 11 illustrates two light sources, LED 1134 and LED 1136. In some embodiments, two light sources emitting light across substantially the same spectrum may be used. The two light sources may be spatially separated to improve the uniformity of the illumination across the imaging area. For example, two LEDs that emit visible light may be used. In such an embodiment, both sources of illumination may be activated simultaneously when an image is to be captured with imaging array 222.

In other embodiments, multiple sources of illumination may be used, with different sources emitting light in different spectra. For example, LED 1134 and LED 1136 emit light in different spectra. LED 1134 may be a visible light source and LED 1136 may be an infrared light source. These sources of illumination may be operated at different times, such that multiple images of an object are captured, each formed based on illumination of a different spectra. In some embodiments, additional information about an object under inspection may be obtained by processing multiple images.

As an example, certain characteristics of a bill of currency may be more easily detected in an image when the bill is illuminated with infrared light than with visible light. In such a scenario, the denomination of a bill of currency may be more accurately recognized by an image analysis algorithm that computes a probability that the features that are more visible when illuminated by infrared light appear in an image captured by imaging array 222 while LED 1136 is illuminated. The imaging algorithm may also compute the probability that features that are more visible in visible light are present in an image captured by imaging array 222 while LED 1134 is turned on. The analysis algorithm may then compute a weighted probability indicating whether a bill of a specific denomination is present in the imaging area by combining these two probabilities. However, any suitable algorithm may be used to control multiple sources of illumination such as LEDs 1134 and 1136 and to process images acquired when those light sources are turned on.

Figure 12:
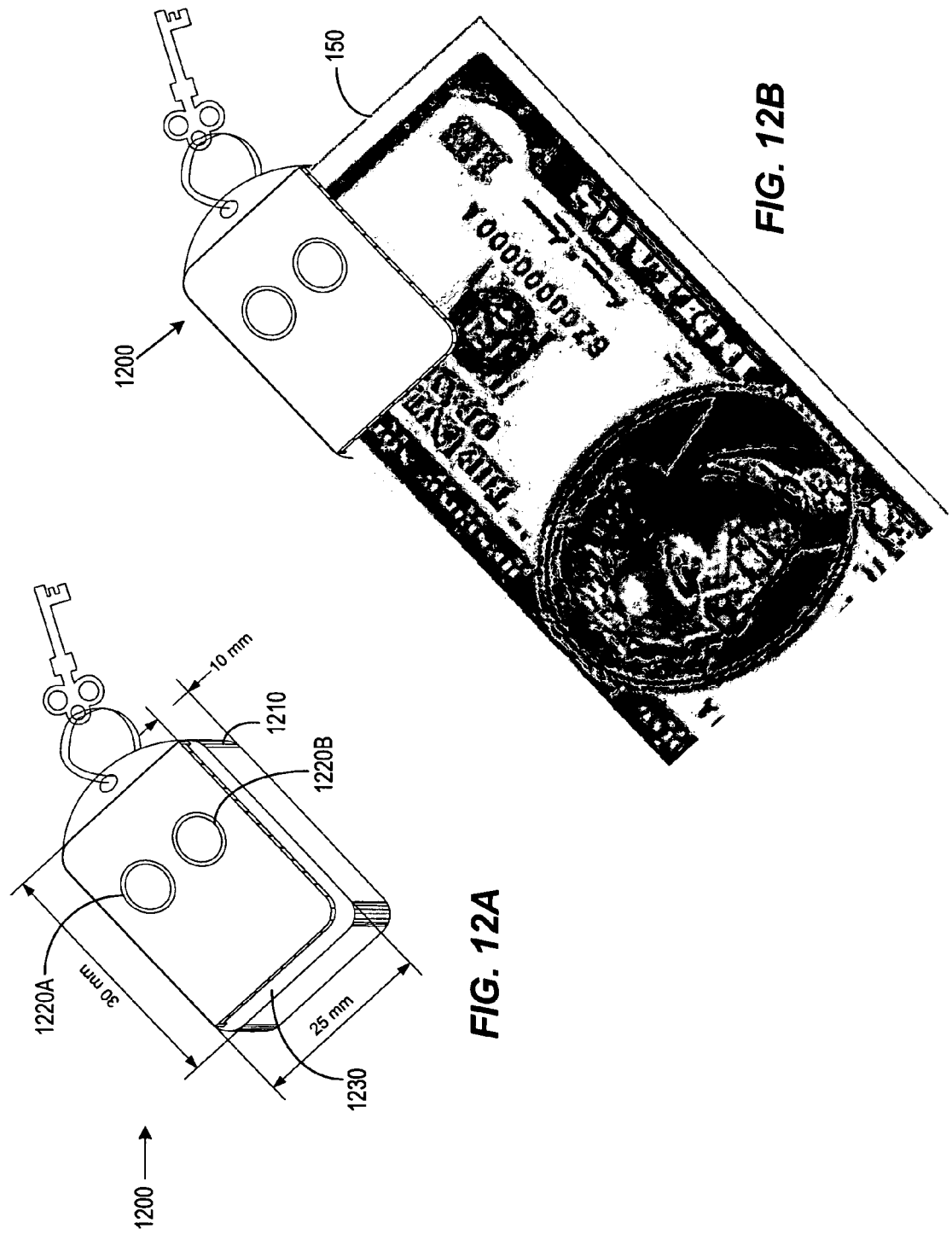
FIG. 12A is a sketch of a currency reader according to some embodiments of the invention.
FIG. 12B is a sketch of the currency reader of FIG. 12A with a bill of currency inserted for reading.

FIGS. 12A and 12B illustrate an alternative embodiment of a compact currency reader. In the embodiment illustrated, an optical system and processing components are packaged in a housing 1210 shaped to form a key fob 1200. The optical components may include pinhole imaging system and a light source that illuminates an imaging area from the side, such as in FIG. 6A, 8 or 9. Such components may be used to form a compact device, which has dimensions such as 30 mm by 25 mm by 10 mm. Buttons, such as buttons 1220A and 1120B may be incorporated at any suitable location on housing 1210. As with embodiments described above, buttons 1220A and 1220B may serve as an input device for a user of the assistive reading device of FIG. 12A. One or more output devices (not shown) may be incorporated within housing 1210. The output devices may include a speaker and/or a mechanical vibrator to produce output in an audible or tactile form.

FIG. 12B illustrates that the assistive reader of FIG. 12A is sized to receive only one corner or a bill 150. Though, other embodiments are possible.

Figure 13:
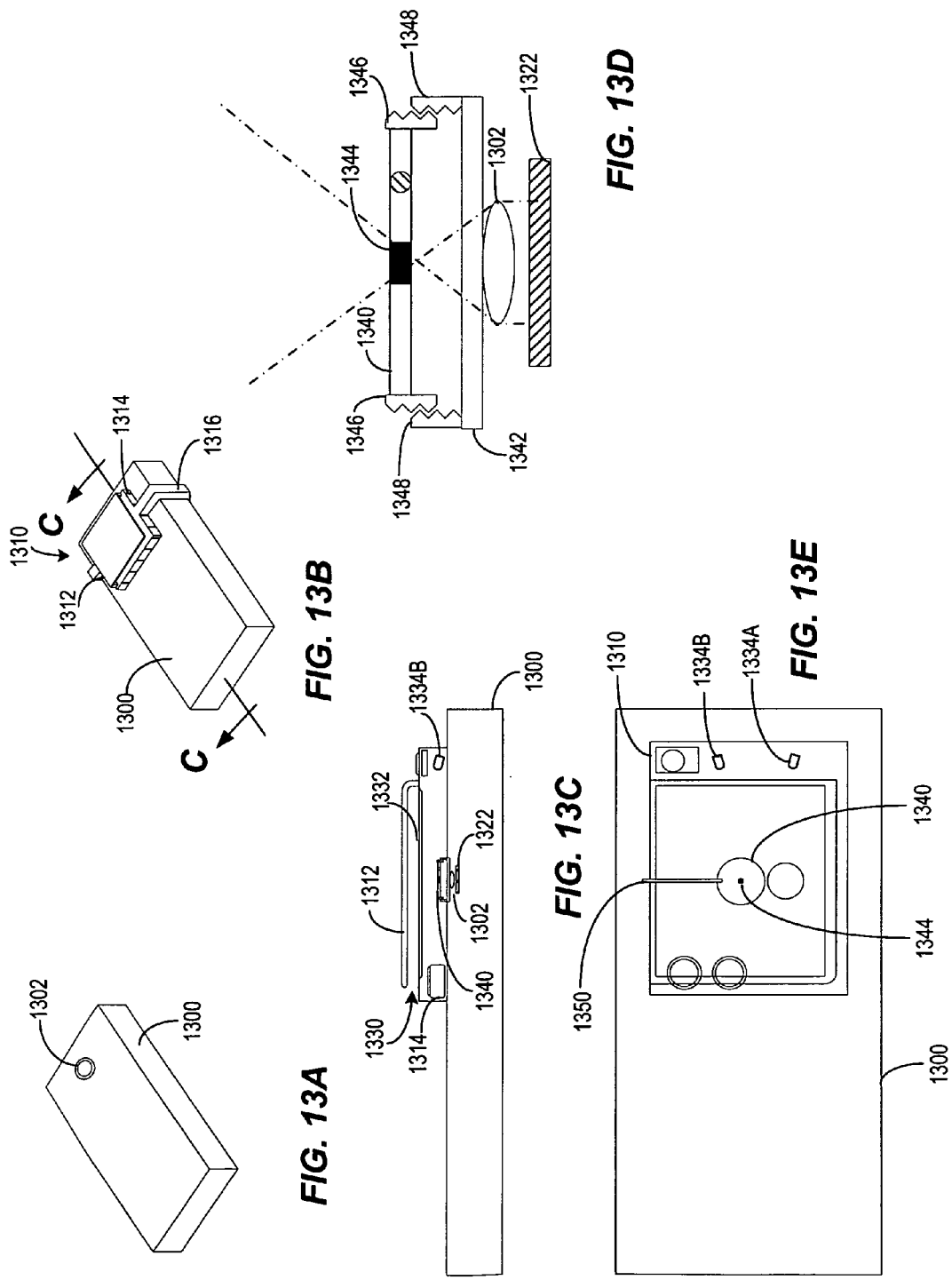
FIG. 13A is a sketch of a portable electronic device (such as a cell phone) with a built in camera that may be fitted with an optical system to form an assistive reading device.
FIG. 13B is a sketch of the cell phone of FIG. 13A with optical components attached to form an assistive reading device according to some embodiments of the invention.
FIG. 13C is a cross section of the assistive reading device of FIG. 13B through the line C-C of FIG. 13B.
FIG. 13D is a schematic illustration of a focusing mechanism that may be incorporated into the optical component illustrated in FIG. 13B.
FIG. 13E schematically illustrates the focusing mechanism of FIG. 13D from an alternative perspective.

Turning to FIGS. 13A . . . 13E, a further embodiment is illustrated. In the embodiment of FIGS. 13A . . . 13E, an assistive device is attached to a portable electronic device that includes an imaging array and processing components that can be programmed to perform functions of an assistive reading device. Such a portable electronic device may also include input and output devices though which commands to control operation of the assistive reading device can be supplied by a user and output can be presented to the user.

As one example of a portable electronic device that may be used to form an assistive reading device, a cell phone 1300 is illustrated. As is known in the art, a cell phone may include a camera that can capture images. In FIG. 13A, lens 1302 of such a camera is illustrated. Cell phone 1300 may include input and output devices, such as buttons and a speaker and/or mechanical vibrator. However, for simplicity, those components are not illustrated in FIG. 13A FIG. 13B illustrates that an optical unit 1310 may be attached to cell phone 1300 to form an assistive reading device. Optical unit 1310 is positioned on cell phone 1300 such that an object placed in an imaging area of optical unit 1310 is projected through lens 1302 onto the imaging array of the camera within cell phone 1300. To facilitate positioning of optical unit 1310, optical unit 1310 is formed with a housing that includes attachment members, illustrated in FIG. 13B as attachment members 1316. Attachment members 1316 may have a fixed shape adapted to conform to a housing of cell phone 1300. Alternatively, attachment members 1316 may have an adjustable shape that can be adjusted to conform to a housing of cell phone 1300, thereby securing optical unit 1310 in position relative to camera 1302 (FIG. 13A).

The housing of optical unit 1310 has an upper portion 1312 and lower portion 1314, separated to define a slot 1330 (FIG. 13C). As with the embodiment of an assistive reading device is FIGS. 12A and 12B, slot 1330 is configured to receive a corner of a bill of currency for which the denomination is to be recognized. Lower portion 1314 may include one or more illumination sources to illuminate an object to be imaged. In addition, lower portion 1314 may contain a support structure that positions a pinhole in an aperture plate such that the pinhole acts as a lens focusing an image of an object placed in slot 1330 through lens 1302 onto an imaging array 1322 within cell phone 1300. Such a configuration is illustrated in FIG. 13C, which represents a cross section of the configuration in FIG. 13B taken along the line C-C.

As can be seen in FIG. 13C, an upper surface of lower portion 1314 is formed with a window 1332. An aperture plate 1340, in the embodiment illustrated, is placed parallel to window 1332.

FIG. 13D shows an enlarged version of the optical system illustrating focusing provided by pinhole 1344 in aperture plate 1340. As can be seen in FIG. 13D, light reflected from an object placed into slot 1330 may be focused by pinhole 1344 onto lens 1302. Lens 1302 may then focus that light into an image on imaging array 1322. Components within cell phone 1300 may capture that image from imaging array 1322 and process it using techniques as described above or in any other suitable way.

Light for forming such an image may be provided by a source of illumination within optical unit 1310. For example, LEDs 1334A and 1334B are illustrated (FIG. 13E). As in embodiments described above, multiple illumination sources may be used to provide uniform illumination across window 1332 or maybe used to allow images based on different illumination spectra to be captured.

In some embodiments, it may be desirable to allow adjustment of the position of aperture plate 1340 as a way to define the spacing between pinhole 1344 and lens 1302. Changing the spacing may adjust the focus of optical unit 1310. In the embodiment illustrated in FIGS. 13D and 13E, an adjustment mechanism is provided. By configuring aperture plate 1340 in a generally circular shape, threads 1346 may be formed in an outwardly directed ends of circular aperture plate 1340. Complimentary threads 1348 may be formed on a member of lower portion 1314. As a result of the threaded engagement between aperture plate 1340 and lower portion 1314, rotation of aperture plate 1340 will cause aperture plate 1340 to ride along the threads, thereby changing the separation between frame 1342, defining the lower surface of optical unit 1310 and aperture plate 1340

FIG. 13E illustrates an adjustment mechanism that may be used to used to rotate aperture plate 1340 such that spacing between pinhole 1344 and lens 1302 is adjusted. In the embodiment of FIG. 13E, the adjustment mechanism is a lever 1350 that extends outside the housing of optical unit 1310. Lever 1350 is coupled to aperture plate 1340 such motion of lever 1350 causes rotation of circular aperture plate 1340. However, any suitable mechanical or motorized mechanism may be used to alter the position of aperture plate 1340.

Regardless of whether and what mechanism is used to focus an image of an object on to an imaging array, the image may be captured from the array as a series of pixels, each representing an intensity value at a point in the image. Those pixel values may then be processed to recognize the denomination of a bill of currency or other symbol or object that may be present in the image. That processing may be performed in any suitable processing components, such as microprocessor 310 of FIG. 1 or a microprocessor within a cell phone 1300 of FIG. 13A.

Figure 14:
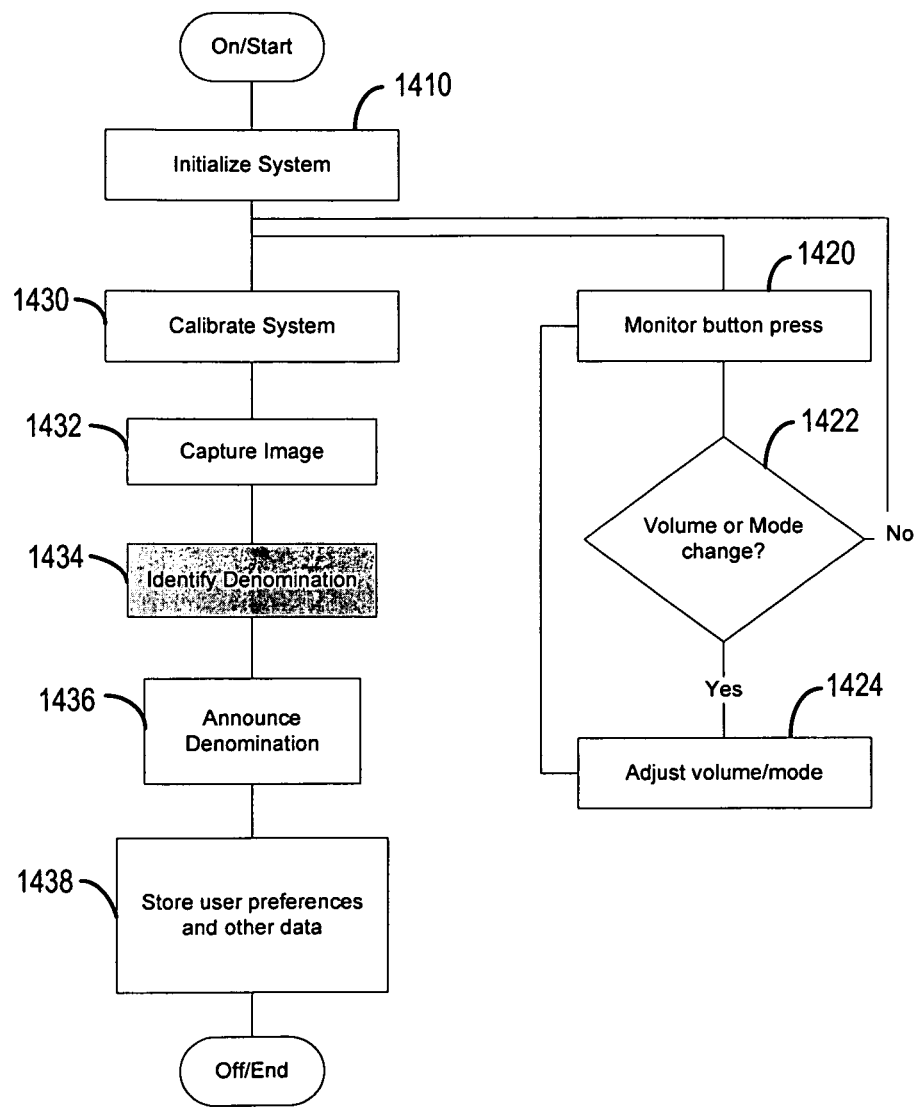
FIG. 14 is a flow chart of an exemplary method of operation of an assistive reading device according to some embodiments of the invention.

Regardless of the specific component that performs this processing, FIG. 14 illustrates a process that may be used to identify a denomination of a bill of currency.

FIG. 14 illustrates a method of operation of a processing system, such as that illustrated in FIG. 3. The process of FIG. 14 begins at block 1410 where the system is initialized. Initialization may occur in response to the device being powered on or other event, such as a user depressing a button, such as button 120A or 120B. Regardless of the triggering event, the system may be initialized in any suitable way. Initialization may be performed using techniques as known to those skilled in the art of digital circuit design. Such initialization may include storing values in memory locations that are used during computations that lead to identification of denomination of a bill of currency.

Once the system is initialized, processing may proceed to block 1420 where the system monitors for a button to be pressed by a user. When a button press is detected, processing may proceed to decision block 1422. At decision block 1422, processing may branch depending on the context of the button press detected at block 1420. In the embodiment illustrated in FIG. 1, an assistive reading device contains two buttons. In the process of FIG. 14, if both buttons are pressed simultaneously, the button press signals that the volume is to be adjusted. Accordingly, processing branches from decision block 1422 to block 1424. At block 1424, the volume and/or mode of operation of the device is changed. When both buttons are pressed simultaneously, each button press may signify that the volume is to be decreased by one level. When the volume is at its lowest level, depressing both buttons may cause the device to switch output modes, providing outputs as vibratory pulses rather than audible tones.

In addition to changing the volume/mode, processing in response to a button press at block 1424 may include other operations, such as outputting a tone or other indication for a user that the button press was detected, regardless of the specific processing performed at block 1424. Once that processing is completed, the process loops back to block 1420 and awaits further input. The process may continue in this loop until a command is received indicating another operation is to be performed.

In the embodiment illustrated, other commands may be signaled by a user depressing a single button. When a single button press is detected, the process will branch from block 1422 to block 1430. At block 1430, the system may be calibrated based on information captured periodically while the system is not in use. In some embodiments, a surface of the upper edge 136 (FIG. 1) facing window 232 may have a calibration pattern. Accordingly, when an image is captured while the system is not in use, the image may contain the calibration pattern. By comparing a calibration image to the calibration pattern, distortions introduced by the optical system, imaging array or other components can be identified. Based on this comparison one or more calibration factors may be computed. These calibration factors may include pixel by pixel gain adjustments, spatial transformations or other factors that can be applied to an image to compensate for distortion.

In the embodiment illustrated, the calibration image is captured periodically to compensate for changes in the system over time. However, to save power, the calibration factors are not computed until an image is to be captured. In other embodiments these functions may be performed at other times.

At block 1432, an image is captured. Processing at block 1432 may include reading the output of an imaging array. Capturing an image at block 1432 may also include applying the calibration factors computed to block 1430.

Once the image is captured, the image may be processed to identify denomination of the bill placed in the imaging area. An example of processing that may be used to identify a denomination at block 1434 is provided in conjunction with FIG. 15 below. Though, any suitable processing may be performed.

Regardless of the specific processing used to identify the denomination, once the denomination is identified, processing proceeds to block 1436 where the denomination is announced. The mechanism of announcing the denomination at block 1436 may depend on the mode set based on processing at block 1424. In scenarios in which the mode has been set at block 1424 for an audible output, the denomination may be announced by a series of tones. Though, in some embodiments, the denomination may be announced using synthesized speech or other audible identification of the denomination. In embodiments in which the mode has been set for a tactile output, the denomination may be announced as a series of vibration pulses.

Regardless of how the denomination is announced, once the denomination has been announced, processing may proceed to block 1438. At block 1438 user preferences, such as the volume and mode of output determined at block 1424 may be stored. Additionally, other data, such as the calibration parameters determined at block 1430 may be stored. This information may be stored in non-volatile memory such that it will be retained when the system is powered off. Thereafter, the system may be fully or partially powered off to conserve power until user input again indicating that a bill is to be read is received. If active components are used to monitor for a button press or to periodically "wake up" the system to capture a calibration image, those components may stay powered on, for example, but all other components may be powered off.

Figure 15:
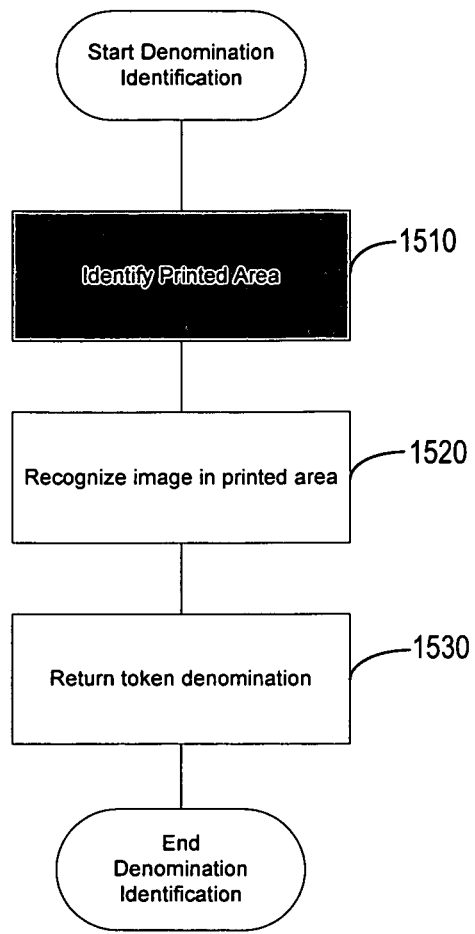
FIG. 15 is a flow chart of an exemplary process for identifying a denomination of a bill in an assistive reading device according to some embodiments of the invention.

FIG. 15 illustrates an exemplary process that may be performed to identify a denomination of a bill of currency at block 1434. That processing begins at block 1510 where a portion of the captured image containing a printed area of the bill is identified. Such an identification may be made in any suitable way. An example of processing to identify the printed area is provided in conjunction with FIG. 16 below.

Regardless of how the printed area is identified, processing proceeds to block 1520 where the image contained within the printed area is recognized. In embodiments in which the assisted reading device is a currency reader, recognizing an image in the printed area involves recognizing the denomination of the bill.

In the embodiment illustrated, denomination of a bill is recognized using a fast normalized cross-correlation function (FNCC). The FNCC process involves comparing templates representing features of denominations of currency to the identified printed area of the bill of currency. The denomination associated with the template that best matches the identified print area is selected as the denomination of the bill of currency.

In the FNCC process, a score is computed for each template, representing a degree of correlation between the template and the identified printed area. These scores can then be compared to select the template that best matches the printed area. Alternatively or additionally, other processing is possible based on the scores. For example, if the highest score is below some threshold value, indicating a relatively poor correlation between the template and the image, the user may be signaled because a low score could indicate that the object in the imaging area is not a bill of currency or, due to an error or other factors, an accurate image of the object was not acquired.

The templates representing denominations may be acquired in any suitable fashion. For example, the templates may be derived from images of samples of bills of currency of known denomination. Features of the bills that are useful in distinguishing between bills of different denominations may be recognized using manual or automated processing. The templates may be created by emphasizing the distinguishing features.

In some embodiments, the templates are represented as an array of pixel values. The template array may have fewer pixels than the identified print area. In such embodiments, the FNCC process may entail a comparison of the template to multiple sub-regions of the identified printed area to find the sub-region at which the template best matches the acquired image. The correlation between this sub-region and the template is taken as the score for the template.

According to the FNCC process, the sub-region of the printed area best matching a template is identified in a two phase process. During the first phase, the template is sequentially compared to only a portion of the possible sub-regions throughout the identified print area. From these sub-regions, the sub-region that best matches the template is selected. In the second phase, sub-regions surrounding this selected sub-region are compared to the template.

As part of the comparison of the template to a sub-region, scores representing the correlation between the template and each of the sub-regions is computed. The highest score computed for any of the sub-regions during the second phase is selected as the overall score for the comparison of the template to the identified print area. In this way, the template is not compared to every possible sub-region of the identified printed area. Because multiple templates are compared to the identified print area in order to recognize the denomination of a bill of currency, limiting the number of comparisons required can speed identification of the denomination. Though, it should be appreciated any suitable processing may be used to recognize a denomination.

Regardless of the manner in which the denomination is identified, a token or other indication of the recognized denomination is returned at block 1530. In the embodiment illustrated, the processing in FIG. 15 is implemented as a sub-program called by the program implementing the processing of FIG. 14. Accordingly, the token, once returned, may be used for processing at block 1436 (FIG. 14) to announce the recognized denomination or for other reasons. Regardless of the manner in which the recognized denomination is used, the processing of FIG. 15 ends after the token identifying the denomination is generated.

Figure 16:
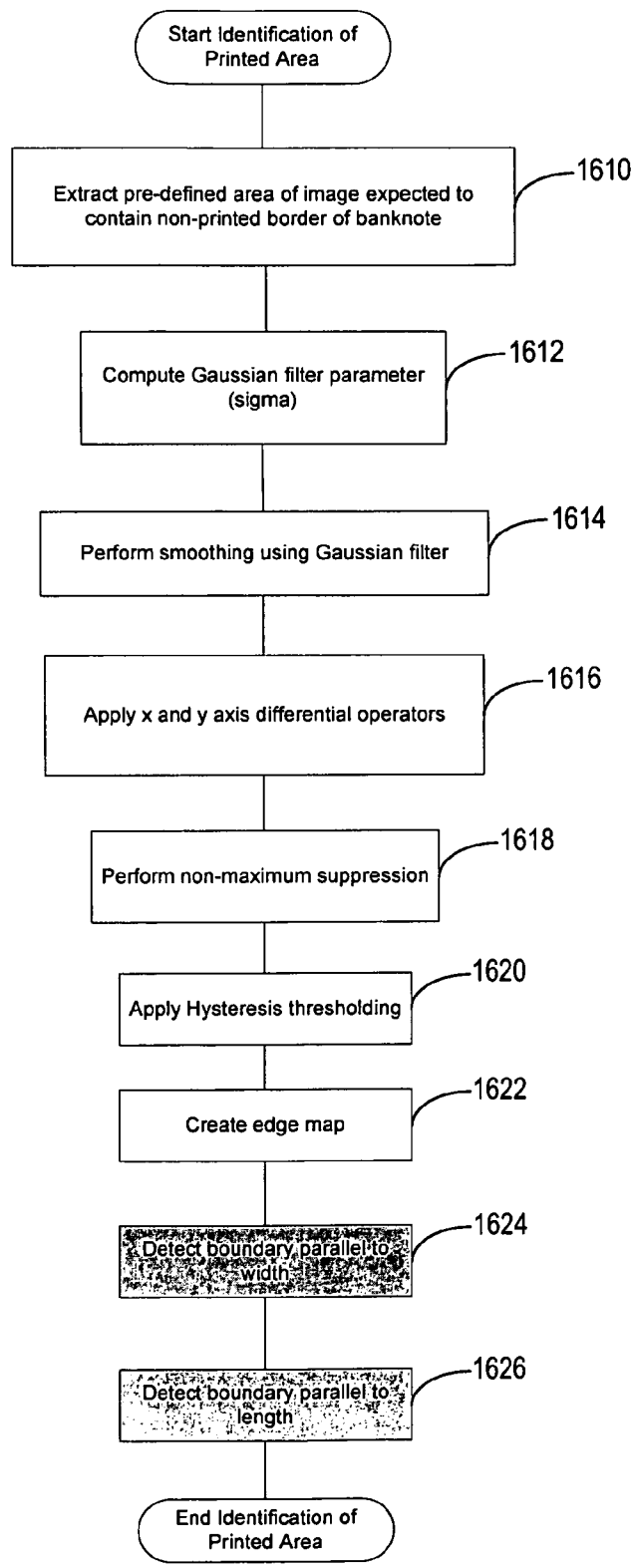
FIG. 16 is a flow chart of a method of processing an image to identify a printed area of a bill of currency according to some embodiments of the invention.

Turning to FIG. 16, an example of a process to identify the portion of an image representing a printed area is provided. In the embodiment illustrated, portions of an acquired image that depict borders on the bill of currency are first identified. Any portions of the image inside the border are deemed to be printed areas of the bill of currency. Though any suitable method may be used to identify borders, a histogramming approach may be used in some embodiments.

FIG. 16 illustrates an example of such a process. The process of FIG. 16 begins at block 1610 where the portions of the image expected to contain non-printed borders are selected for processing. In embodiments illustrated above, a bill of currency may be recognized from an image of a corner of the bill and position sensors are used to control image acquisition such that an image is acquired when the corner of the bill is aligned in an imaging area. Accordingly, the acquired image can be expected to contain sides of the bill of currency along two predefined sides of the imaged area. The non-printed border can therefore be expected to be adjacent to these sides. The pixels representing regions adjacent these sides may be selected at block 1610 for processing.

The selected portions of the image may be filtered or otherwise processed to highlight differences between non-printed border regions and other portions of the image. For example, processing at block 1612 may involve computing a Gaussian filter parameter, sigma, as is known in the art. The computed parameter may be applied at block 1614 to perform smoothing of the portion of the image selected at block 1612 using a Gaussian filter with the parameters determined at block 1612.

The smoothed image may be further processed. For example, processing may be performed to enhance the appearance of edges of objects in the image. Accordingly, the exemplary process of FIG. 16 continues to block 1616 where X and Y differential operators are applied. At block 1618, non-maximum suppression is performed using known techniques. Such processing has the effect of de-emphasizing portions of the image that are not indicative of edges of objects captured in the image. At block 1620, a hysteresis threshold may be applied and an edge map may be created at block 1622 using known processing techniques. The edge map may represent the portion of the image selected at block 1610 with edges of objects emphasized.

Figure 17:
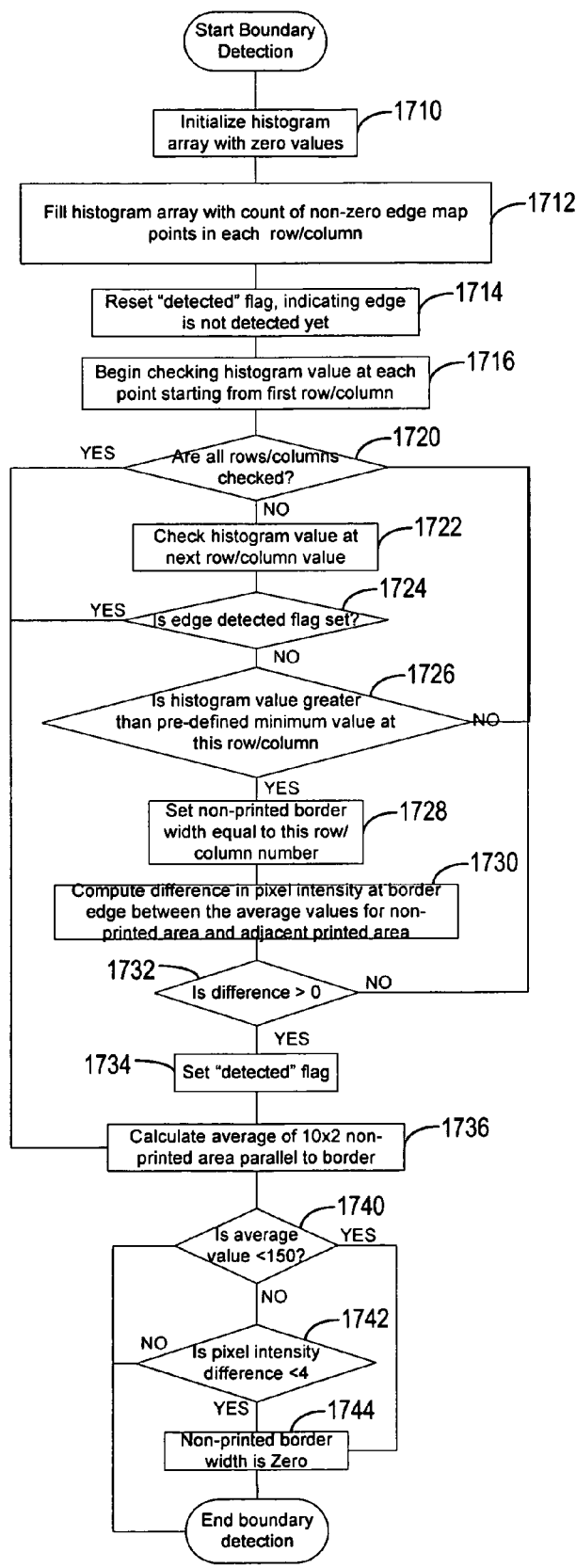
FIG. 17 is a flow chart of a method of detecting a border on a bill of currency that may be used as part of identifying a print area according to the method of FIG. 16.

Regardless of the preprocessing performed, a histogramming technique may be applied to rapidly identify a boundary between the portions of the bill of currency to be identified. The histogramming process may be performed twice, once along each side of the image such that both borders may be identified. At block 1624 processing is performed along one side and at block 1626 the same process is repeated along the perpendicular side. FIG. 17 provides an example of the histogramming process that may be applied to detect the border along each side.

The process at FIG. 17 begins at block 1710 where an array of memory locations representing a histogram is initialized. In this example, the array is initialized with zero values. At block 1712, the histogram array is filled with values derived from the edge map created at block 1622 (FIG. 16). In this example, the array is filled with a value for each row or column of pixels parallel to the side of the bill along which a border region is to be detected. The value is derived by counting the number of non-zero points in the edge map computed at block 1622. Consequently, the histogram array populated at block 1712 contains, in each successive entry, a count of the number of edge pixels that appear in the line parallel to the side of the bill along which the non-printed border region is to be detected. Each successive value in the array provides that count for a line one pixel width further away from the side of the bill. If the line passes through the non-printed border region, there should be few or no edges along that line and the count in the histogram array should be near zero. Accordingly, the values in the histogram array may indicate the location relative to the side of the bill of currency of the transition between a non-printed border area and the image area.

This processing begins at block 1714 where a detected flag is reset. At block 1716, processing of the histogram array begins, starting with the value representing the line closest to the side of the bill.

At decision block 1720, the process branches depending on whether all values in the array have been checked. If all entries have not been checked, processing branches to block 1722. Conversely, if all entries have been checked, processing branches to block 1736.

At block 1722 the histogram value at the next location in the array is checked. If the edge detected flag is set, processing branches to block 1736. Conversely, if the edge detected flag is not set, processing continues to decision block 1726.

At decision block 1726, the process branches depending on whether the histogram value being checked is above a threshold value. If not, the process loops back to decision block 1720 and 1722 where the next subsequent value in the histogram array is processed.

Conversely, if, as a result of the comparison at decision block 1726, it is determined that the value in the histogram array exceeds the threshold, processing proceeds to block 1728. If processing reaches block 1728, the array value being processed may be tentatively assumed to define the transition between the non-printed border region and the print area of the image. In subsequent processing steps, this assumption may be verified.

At block 1730, values from the initial image acquired of the bill of currency are processed. Pixels at the location identified at block 1728, the presumptive boundary between the non-printed and printed areas of the bill, are selected for processing. An average intensity of pixels on each side of the presumptive boundary between printed and non-printed areas are computed. Processing branches at decision block 1732 depending on the magnitude of the difference between these intensity values. If the intensity difference is greater than zero, processing branches to block 1734 where the detected flag is set. Conversely, if the difference is not greater than zero, processing loops back to decision block 1720, where the process may be repeated using a next value in the histogram array.

Following setting of the detected flag at block 1734, processing proceeds to block 1736. Processing may also arrive at block 1736 once all values in the histogram array have been checked, as determined at decision block 1720.

Regardless of how processing reaches block 1736, an average pixel intensity value is computed for a long narrow strip of pixels within the region presumed to be a portion of the non-printed border region based on the location presumptively set at block 1728. In the example illustrated, the long narrow strip of pixels is 10 pixels long by two pixels wide. However, any suitable sized region may be used for the calculation.

The process branches at decision block 1740, depending on the value of the average intensity computed at block 1736. If the average is less than a threshold, for example 150, the location determined at block 1728 may be regarded as confirmed, and the processing of FIG. 17 may end with a value computed at block 1728 as the confirmed location of the boundary between the printed and non-printed areas of the bill of currency. Conversely, if the average is not less than the threshold applied at decision block 1740, the process may continue to decision block 1742. At decision block 1742, the process may again branch. At decision block 1742, the process branches, depending on the values of the pixels in the long narrow region selected at block 1736. If the values of the pixels over that region differ by more than a threshold, the process may branch to block 1744. If processing reaches block 1744, it may be assumed that pixels falling within the non-printed border region identified at block 1728 are actually within a printed area of the bill and the border region is set to zero. Setting a border region to zero may increase the amount of processing required at block 1520 (FIG. 15) when correlating templates to the recognized printed area. However, it increases the accuracy of the recognition performed at block 1520 by ensuring that regions of the printed area are not unintentionally discarded by incorrectly labeling those regions as part of the non-printed border area.

Once the processing of block 1744 is completed, the process of identifying a non-printed border area may be completed. Similarly, if, as determined at decision block 1742, the pixel intensity difference is not less than the threshold, the processing similarly ends. If processing ends following decision block 1742 because the pixel intensity difference is not less than the threshold, the edge of the non-printed border region will be as determined at block 1728.

Having thus described several aspects of at least one embodiment of this invention, it is to be appreciated that various alterations, modifications, and improvements will readily occur to those skilled in the art.

As one example, output devices such as a speaker and a mechanical vibrator are described. Other output devices may alternatively or additionally be used and the device need not be integral with the assistive reading device. For example, a wireless connection may be provided to a headset, such as a Bluetooth headset, may be included as an output device.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. Compact apparatus for close-range imaging of an object in an imaging area, the apparatus comprising:
   a support structure defining the imaging area;
      a surface supported by the support structure, the surface having a pin-hole aperture therethrough;
      an imaging array supported by the support structure, wherein:
         the surface is positioned with the pin-hole aperture disposed in an optical path between the imaging area and the imaging array;
         the imaging array is spaced from the imaging area by a distance of less than 25 mm; and
         at least 75 mm$^2$ of the imaging area is focused on the imaging array through the pin-hole aperture.

2. The compact apparatus of claim 1, wherein the pin-hole aperture provides a field of view of at least 75 degrees.

3. The compact apparatus of claim 1 adapted as a currency reader, wherein:
   the support structure comprises a slot sized and positioned to provide a passage for a bill of currency between the imaging area and an area external to the compact apparatus.

4. The compact apparatus of claim 3, wherein:
   the support structure comprises at least one alignment feature sized and positioned to align a corner of the bill in the imaging area; and
   the compact apparatus further comprises circuitry adapted to process an image of the corner of the bill to identify a unique pattern representing a denomination of the bill.

5. The compact apparatus of claim 4, wherein:
   the slot is sized and positioned to receive only a corner of the bill.

6. The compact apparatus of claim 5, wherein the support structure comprises a housing, the housing being shaped as a key fob.

7. The compact apparatus of claim 4, wherein:
   the compact apparatus further comprises a speaker; and
   the circuitry comprises an audio generator coupled to the speaker, the audio output generator adapted to generate an audio signal representative of an identified denomination of the bill.

8. The compact apparatus of claim 7, wherein:
   the compact apparatus further comprises a user control mechanism, the user control mechanism consisting essentially of two buttons;
   the circuitry is adapted to respond to a user activating one of the two buttons by processing an image to identify a number representing a denomination of the bill; and
   the circuitry is adapted to respond to a user activating two of the two buttons by altering a volume at which the audio output signal is rendered through the speaker.

9. The compact apparatus of claim 8, wherein:
   the compact apparatus comprises a housing comprising a wider surface and two opposing side surfaces perpendicular to the wider surface, each side surface being narrower than the wider surface in at least one dimension;
   the slot passes through the wider surface; and
   one of the two buttons is disposed in each of the narrower surfaces.

10. The compact apparatus of claim 4, wherein the circuitry comprises a processor and a computer storage medium encoded with computer executable instructions that, when executed by the processor, process the image of the corner of the bill to identify the number representing the denomination of the bill.

11. The compact apparatus of claim 10, wherein the image of the corner of the bill comprises an image of an area with dimensions less than 15 mm by 20 mm.

12. The compact apparatus of claim 4, wherein:
   the compact apparatus further comprises at least two optical position sensors, each optical position sensor adapted to generate a control signal indicating position of the bill within the slot; and
   the circuitry is adapted to process an image automatically in response to the control signals from the at least two optical position sensors.

13. The compact apparatus of claim 1, wherein:
   the optical path between the imaging area and the imaging array is free of mirrors.

14. The compact apparatus of claim 1, further comprising:
   a light source;
   an optical element disposed between the light source and the imaging area, the optical element refracting light from the light source by at least 45 degrees, whereby light from the light source is directed at the imaging area.

15. The compact apparatus of claim 1, further comprising:
   a prism film adjacent the imaging area;
   a light source, the light source being positioned:
      between the surface and the prism film so as to irradiate the prism film; and
      outside of any direct optical path between the imaging array and the imaging area.

16. The compact apparatus of claim 1, further comprising a light source, the light source being positioned:
   between the surface and the imaging area; and
   offset from a line between a center of the image array and a center of the imaging area in a direction perpendicular to the line.

17. The compact apparatus of claim 16, further comprising:
   a reflector comprising a reflective surface, the reflector being positioned offset from the line in a direction perpendicular to the line with the reflective surface facing the light source.

18. The compact apparatus of claim 17, wherein the reflector comprises a patterned reflector, the reflector comprising a pattern that is more reflective in a center of the reflective surface than along at least two edges of the reflective surface.

19. The compact apparatus of claim 16, wherein the light source comprises a first light emitting element and a second light emitting element, the first light emitting element and the second light emitting element emitting light at different wavelengths.

20. The compact apparatus of claim 16, wherein the first light emitting element emits light in a visible spectrum and the second light emitting element emits light in an infrared (IR) spectrum.

21. The compact apparatus of claim 20, further comprising:
   circuitry coupled to the imaging array adapted to identify a denomination of a bill disposed within the imaging area, the circuitry adapted to identify the denomination by processing a first image output from the imaging array while the imaging area is illuminated with only the first light source and a second image output from the imaging array while the imaging area is illuminated with only the second light source.

22. The compact apparatus of claim 1, further comprising:
a solid light pipe oriented to distribute light to the imaging area.

23. The compact apparatus of claim 1, wherein:
the imaging area comprises a planar region;
a region of the surface comprising the pin hole is planar; and
a normal to the planar region of the imaging area is parallel to a normal to the planar region of the surface.

24. The compact apparatus of claim 1, wherein:
the imaging area comprises a planar region;
a region of the surface comprising the pin hole is planar; and
a normal to the planar region of the imaging area is transverse to a normal to the planar region of the surface.

25. The compact apparatus of claim 24, wherein the imaging array is planar and transverse to the planar region of the surface.

26. The compact apparatus of claim 1, wherein the support structure comprises a mechanism for mechanically coupling the compact apparatus to an electronic device with a display screen.

27. The compact apparatus of claim 26, wherein:
the compact apparatus further comprises a speaker; and
the circuitry comprises a text to speech converter coupled to the speaker, the text to speech converter adapted to generate an audio signal representative of text on the display screen of the electronic device.

28. Compact apparatus for close-range imaging of an object, the apparatus comprising:
a housing having dimensions of less than 100 mm in length, 20 mm in height and 50 mm in width;
a planar imaging area mechanically coupled to the housing;
an imaging array mechanically coupled to the housing;
a planar surface mechanically coupled to the housing, the planar surface having a pin hole aperture therethrough, and the planar surface being positioned in an optical path between the imaging area and the imaging array.

29. The compact apparatus of claim 28, wherein the housing comprises a slot shaped and positioned to guide a corner of a bill of currency into the imaging area.

30. The compact apparatus of claim 29, further comprising:
circuitry, coupled to the imaging array, adapted to process an output of the imaging array and recognize a denomination of a bill having a corner in the imaging area; and
an audio output mechanism coupled to the circuitry, the audio output mechanism adapted to output an audible indication of the recognized denomination of the bill.

31. The compact apparatus of claim 30, wherein:
the housing comprises a first surface spanning the length and width of the housing, the first surface comprising a textured gripping area, and wherein the slot passes through the first surface;
the housing comprises a first end surface and a second end surface, each joined to the first surface at an edge and each spanning with width and height of the housing; and
the compact apparatus further comprises a first control button disposed in the first end surface and a second control button in the second end surface.

* * * * *